US012265586B2

(12) United States Patent
Anvaripour et al.

(10) Patent No.: US 12,265,586 B2
(45) Date of Patent: *Apr. 1, 2025

(54) INTERFACES TO ORGANIZE AND SHARE LOCATIONS AT A DESTINATION GEOLOCATION IN A MESSAGING SYSTEM

(71) Applicant: Snap Inc., Santa Monica, CA (US)

(72) Inventors: Kaveh Anvaripour, Culver City, CA (US); Virginia Drummond, Venice, CA (US); Erika Michele Kehrwald, Venice, CA (US); Jean Luo, Seattle, WA (US); Alek Matthiessen, Marina Del Rey, CA (US); Celia Nicole Mourkogiannis, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,872

(22) Filed: Nov. 1, 2023

(65) Prior Publication Data
US 2024/0061898 A1 Feb. 22, 2024

Related U.S. Application Data

(63) Continuation of application No. 17/147,008, filed on Jan. 12, 2021, now Pat. No. 11,809,507.
(Continued)

(51) Int. Cl.
*H04W 4/021* (2018.01)
*G06F 3/0488* (2022.01)
(Continued)

(52) U.S. Cl.
CPC ........ *G06F 16/9537* (2019.01); *G06F 3/0488* (2013.01); *G06F 16/9536* (2019.01); *H04L 51/222* (2022.05); *H04W 4/021* (2013.01)

(58) Field of Classification Search
CPC ............. G06F 16/9537; G06F 16/9536; G06F 3/0488; H04L 51/222; H04W 4/021
See application file for complete search history.

(56) References Cited

U.S. PATENT DOCUMENTS 8,681,178 B1  3/2014  Tseng
8,797,353 B2  8/2014  Bregman-amitai et al.
(Continued)

FOREIGN PATENT DOCUMENTS

CN  107038616  8/2017
CN  110709835  1/2020
(Continued)

OTHER PUBLICATIONS

"U.S. Appl. No. 17/146,973, Non Final Office Action mailed Apr. 5, 2022", 13 pgs.
(Continued)

*Primary Examiner* — Dai Phuong
(74) *Attorney, Agent, or Firm* — SCHWEGMAN LUNDBERG & WOESSNER, P.A.

(57) ABSTRACT

The subject technology causes, at a client device, display of a graphical interface comprising a plurality of selectable graphical items, each selectable graphical item corresponding to a respective content item associated with a different geolocation. The subject technology receives, at the client device, a selection of a first selectable graphical item from the plurality of selectable graphical items, the first selectable graphical item corresponding to a particular geolocation. The subject technology causes display, at the client device, a second plurality of selectable graphical items, each of the second plurality of selectable graphical items corresponding to a particular second geolocation of an activity or place of business within a geographical area associated with the particular geolocation.

20 Claims, 19 Drawing Sheets

Related U.S. Application Data

(60) Provisional application No. 63/085,984, filed on Sep. 30, 2020.

(51) Int. Cl.
*G06F 16/9536* (2019.01)
*G06F 16/9537* (2019.01)
*H04L 51/222* (2022.01)

(56) References Cited

U.S. PATENT DOCUMENTS

| | | | |
|---|---|---|---|
| 9,632,671 B2* | 4/2017 | Albright | H04W 4/029 |
| 10,242,477 B1 | 3/2019 | Charlton et al. | |
| 10,484,817 B1 | 11/2019 | Chipouras et al. | |
| 10,496,272 B1 | 12/2019 | Lonkar et al. | |
| 10,559,107 B1 | 2/2020 | Charlton et al. | |
| 10,740,974 B1 | 8/2020 | Cowburn et al. | |
| 10,789,473 B2 | 9/2020 | Jung et al. | |
| 10,839,219 B1 | 11/2020 | Suiter et al. | |
| 10,956,743 B1 | 3/2021 | Li et al. | |
| 11,044,393 B1 | 6/2021 | Suiter et al. | |
| 11,201,981 B1 | 12/2021 | Suiter et al. | |
| 11,270,067 B1 | 3/2022 | Paul | |
| 11,538,225 B2 | 12/2022 | Anvaripour et al. | |
| 11,592,311 B2 | 2/2023 | Yoo et al. | |
| 11,625,142 B2 | 4/2023 | An et al. | |
| 11,809,507 B2 | 11/2023 | Anvaripour et al. | |
| 11,816,805 B2 | 11/2023 | Anvaripour et al. | |
| 11,836,826 B2 | 12/2023 | Canberk et al. | |
| 12,039,499 B2 | 7/2024 | Anvaripour et al. | |
| 2008/0097698 A1* | 4/2008 | Arnold-Huyser | G01C 21/3682 701/300 |
| 2012/0001939 A1 | 1/2012 | Sandberg | |
| 2012/0075341 A1 | 3/2012 | Sandberg | |
| 2013/0039631 A1* | 2/2013 | Hovagim | H04N 21/6587 386/E5.002 |
| 2013/0332890 A1 | 12/2013 | Ramic et al. | |
| 2014/0076965 A1 | 3/2014 | Becorest et al. | |
| 2015/0127486 A1 | 5/2015 | Advani | |
| 2015/0206349 A1 | 7/2015 | Rosenthal et al. | |
| 2016/0047672 A1* | 2/2016 | Sachdev | G01C 21/3685 701/438 |
| 2016/0133230 A1 | 5/2016 | Daniels et al. | |
| 2016/0308985 A1 | 10/2016 | Qi et al. | |
| 2017/0103442 A1 | 4/2017 | Wright | |
| 2017/0123614 A1 | 5/2017 | Perlegos et al. | |
| 2017/0199496 A1 | 7/2017 | Grata et al. | |
| 2017/0371883 A1 | 12/2017 | Bailiang et al. | |
| 2018/0082430 A1 | 3/2018 | Sharma et al. | |
| 2018/0167692 A1 | 6/2018 | Kedenburg, III et al. | |
| 2018/0191797 A1 | 7/2018 | Javier et al. | |
| 2018/0224560 A1 | 8/2018 | Xi et al. | |
| 2018/0278462 A1 | 9/2018 | Bjontegard | |
| 2018/0315134 A1 | 11/2018 | Amitay et al. | |
| 2018/0322174 A1 | 11/2018 | Vasilyev et al. | |
| 2018/0349413 A1 | 12/2018 | Shelby et al. | |
| 2019/0005739 A1* | 1/2019 | Gazlay | G06Q 30/0645 |
| 2019/0018859 A1* | 1/2019 | Miyaoka | G06Q 50/10 |
| 2019/0073831 A1 | 3/2019 | Kim | |
| 2019/0179947 A1 | 6/2019 | O'brien et al. | |
| 2019/0279250 A1 | 9/2019 | Gordon et al. | |
| 2019/0295056 A1 | 9/2019 | Wright | |
| 2019/0310757 A1 | 10/2019 | Lee et al. | |
| 2019/0318540 A1 | 10/2019 | Piemonte et al. | |
| 2020/0066044 A1 | 2/2020 | Stahl et al. | |
| 2020/0128106 A1 | 4/2020 | Mccormack et al. | |
| 2020/0220823 A1 | 7/2020 | Eirinberg et al. | |
| 2020/0357165 A1 | 11/2020 | Dixit et al. | |
| 2021/0042724 A1* | 2/2021 | Rathod | G07G 1/0054 |
| 2021/0056761 A1 | 2/2021 | Nigam et al. | |
| 2021/0097875 A1 | 4/2021 | Alexander, IV et al. | |
| 2022/0004308 A1 | 1/2022 | Simpson | |
| 2022/0100812 A1 | 3/2022 | Anvaripour et al. | |
| 2022/0101565 A1 | 3/2022 | Anvaripour et al. | |
| 2022/0101606 A1 | 3/2022 | Canberk et al. | |
| 2022/0101610 A1 | 3/2022 | Anvaripour et al. | |
| 2023/0079325 A1 | 3/2023 | Anvaripour et al. | |
| 2024/0062474 A1 | 2/2024 | Canberk et al. | |
| 2024/0062493 A1 | 2/2024 | Anvaripour et al. | |
| 2024/0320631 A1 | 9/2024 | Anvaripour et al. | |

FOREIGN PATENT DOCUMENTS

| | | |
|---|---|---|
| CN | 116210019 A | 6/2023 |
| CN | 116261710 A | 6/2023 |
| CN | 116325663 A | 6/2023 |
| CN | 116964547 A | 10/2023 |
| CN | 116210019 | 7/2024 |
| JP | 2022121496 A | 8/2022 |
| KR | 20110134736 A | 12/2011 |
| KR | 20130140339 | 12/2013 |
| KR | 20150037725 | 4/2015 |
| KR | 102635705 | 2/2024 |
| KR | 102728598 | 11/2024 |
| WO | 2020069401 | 4/2020 |
| WO | WO-2021076754 A1 | 4/2021 |
| WO | WO-2022072177 A1 | 4/2022 |
| WO | WO-2022072187 A2 | 4/2022 |
| WO | WO-2022072187 A3 | 4/2022 |
| WO | WO-2022072976 A1 | 4/2022 |
| WO | WO-2022072983 A1 | 4/2022 |

OTHER PUBLICATIONS

"U.S. Appl. No. 17/146,973, Notice of Allowance mailed Aug. 22, 2022", 7 pgs.

"U.S. Appl. No. 17/146,973, Response filed Jul. 5, 2022 to Non Final Office Action mailed Apr. 5, 2022", 11 pgs.

"U.S. Appl. No. 17/147,008, Final Office Action mailed Aug. 23, 2022", 14 pgs.

"U.S. Appl. No. 17/147,008, Non Final Office Action mailed Feb. 9, 2023", 14 pgs.

"U.S. Appl. No. 17/147,008, Non Final Office Action mailed Mar. 17, 2022", 13 pgs.

"U.S. Appl. No. 17/147,008, Notice of Allowance mailed Jun. 27, 2023", 8 pgs.

"U.S. Appl. No. 17/147,008, Response filed Jan. 20, 2023 to Final Office Action mailed Aug. 23, 2022", 11 pgs.

"U.S. Appl. No. 17/147,008, Response filed May 9, 2023 to Non Final Office Action mailed Feb. 9, 2023", 12 pgs.

"U.S. Appl. No. 17/147,008, Response filed Jun. 17, 2022 to Non Final Office Action mailed Mar. 17, 2022", 10 pgs.

"U.S. Appl. No. 17/235,280, Corrected Notice of Allowability mailed Nov. 8, 2023", 11 pgs.

"U.S. Appl. No. 17/235,280, Final Office Action mailed Jan. 26, 2023", 20 pgs.

"U.S. Appl. No. 17/235,280, Final Office Action mailed Feb. 4, 2022", 16 pgs.

"U.S. Appl. No. 17/235,280, Non Final Office Action mailed Aug. 10, 2022", 21 pgs.

"U.S. Appl. No. 17/235,280, Non Final Office Action mailed Sep. 22, 2021", 14 pgs.

"U.S. Appl. No. 17/235,280, Notice of Allowance mailed Jul. 11, 2023", 14 pgs.

"U.S. Appl. No. 17/235,280, Response filed Jan. 24, 2022 to Non Final Office Action mailed Sep. 22, 2021", 12 pgs.

"U.S. Appl. No. 17/235,280, Response filed May 4, 2022 to Final Office Action mailed Feb. 4, 2022", 13 pgs.

"U.S. Appl. No. 17/235,280, Response filed May 26, 2023 to Final Office Action mailed Jan. 26, 2023", 12 pgs.

"U.S. Appl. No. 17/235,280, Response filed Nov. 10, 2022 to Non Final Office Action mailed Aug. 10, 2022", 13 pgs.

"U.S. Appl. No. 17/235,411, Non Final Office Action mailed Aug. 31, 2023", 12 pgs.

"U.S. Appl. No. 17/235,411, Response filed Jan. 2, 2024 to Non Final Office Action mailed Aug. 31, 2023", 14 pgs.

(56) References Cited

OTHER PUBLICATIONS

"U.S. Appl. No. 18/056,122, Corrected Notice of Allowability mailed Aug. 4, 2023", 2 pgs.
"U.S. Appl. No. 18/056,122, Non Final Office Action mailed Mar. 15, 2023", 15 pgs.
"U.S. Appl. No. 18/056,122, Notice of Allowance mailed Jul. 10, 2023", 7 pgs.
"U.S. Appl. No. 18/056,122, Response filed Jun. 13, 2023 to Non Final Office Action mailed Mar. 15, 2023", 9 pgs.
"Chinese Application Serial No. 202180066305.0, Notification to Make Rectification mailed Jun. 2, 2023", W/O English Translation, 2 pgs.
"Chinese Application Serial No. 202180066305.0, Notification to Make Rectification mailed Sep. 5, 2023", W/O English Translation, 2 pgs.
"Chinese Application Serial No. 202180066475.9, Voluntary Amendment filed Sep. 21, 2023", W/English Translation, 12 pgs.
"International Application Serial No. PCT/US2021/035389, International Search Report mailed Sep. 27, 2021", 3 pgs.
"International Application Serial No. PCT/US2021/035389, Written Opinion mailed Sep. 27, 2021", 4 pgs.
"International Application Serial No. PCT/US2021/051294, International Preliminary Report on Patentability mailed Apr. 13, 2023", 8 pgs.
"International Application Serial No. PCT/US2021/051294, International Search Report mailed Dec. 22, 2021", 5 pgs.
"International Application Serial No. PCT/US2021/051294, Written Opinion mailed Dec. 22, 2021", 6 pgs.
"International Application Serial No. PCT/US2021/051419, International Preliminary Report on Patentability mailed Apr. 13, 2023", 11 pgs.
"International Application Serial No. PCT/US2021/051419, International Search Report mailed Mar. 21, 2022", 7 pgs.
"International Application Serial No. PCT/US2021/051419, Invitation to Pay Additional Fees mailed Jan. 7, 2022", 10 pgs.
"International Application Serial No. PCT/US2021/051419, Written Opinion mailed Mar. 21, 2022", 9 pgs.
"International Application Serial No. PCT/US2021/071493, International Preliminary Report on Patentability mailed Apr. 13, 2023", 9 pgs.
"International Application Serial No. PCT/US2021/071493, International Search Report mailed Dec. 6, 2021", 4 pgs.
"International Application Serial No. PCT/US2021/071493, Written Opinion mailed Dec. 6, 2021", 7 pgs.
"International Application Serial No. PCT/US2021/071570, International Preliminary Report on Patentability mailed Apr. 13, 2023", 9 pgs.
"International Application Serial No. PCT/US2021/071570, International Search Report mailed Dec. 23, 2021", 5 pgs.
"International Application Serial No. PCT/US2021/071570, Written Opinion mailed Dec. 23, 2021", 7 pgs.
"Publish 3D scene", Adobe Dimension User Guide, XP055873491, [Online] Retrieved from the Internet: <URL: https://helpx.adobe.com/dimension/using/publish-3d-scene.html>, (Jun. 12, 2020), 3 pgs.
Brata, KC Liang, et al., "Location-based augmented reality information for bus route planning system", International Journal of Electrical and Computer Engineering, (Feb. 2015), 8 pgs.
Du, Ruofei, et al., "Social street view: blending immersive street views with geo-tagged social media", ACM Web3D Technology, [Online] Retrieved from the Internet: <URL: https://dl.acm.org/doi/pdf/10.145/2945292.2945294>, (Jul. 22, 2016), 77-85.
Nayyar, A Mahapatra, et al., "Virtual Reality (VR) & Augmented Reality (AR) technologies for tourism and hospitality industry", International journal of engineering &technology., (2018), 156-60.
Neuburger, Larissa Julia, et al., "The 'Phygital'tourist experience: The use of augmented and virtual reality in destination marketing", In Tourism planning and destination marketing, Emerald Publishing Limited, (2018), 183-202.
"Chinese Application Serial No. 202180066475.9, Office Action mailed Jan. 26, 2024", w/ English Translation, 11 pgs.
"U.S. Appl. No. 17/235,411, Notice of Allowance mailed Mar. 4, 2024", 8 pgs.
"U.S. Appl. No. 17/235,411, Corrected Notice of Allowability mailed Mar. 25, 2024", 2 pgs.
"Korean Application Serial No. 10-2023-7014503, Notice of Preliminary Rejection mailed Apr. 3, 2024", w/ English Translation, 10 pgs.
"Chinese Application Serial No. 202180066475.9, Response filed May 13, 2024 to Office Action mailed Jan. 26, 2024", 51 pgs.
"U.S. Appl. No. 18/499,811, Non Final Office Action mailed Jun. 5, 2024", 17 pgs.
"U.S. Appl. No. 18/501,875, Non Final Office Action mailed Jun. 20, 2024", 18 pgs.
"U.S. Appl. No. 18/501,875, Response filed Sep. 19, 2024 to Non Final Office Action mailed Jun. 20, 2024", 9 pgs.
"U.S. Appl. No. 18/499,811, Response filed Oct. 7, 2024 to Non Final Office Action mailed Jun. 5, 2024", 11 pgs.
"U.S. Appl. No. 18/501,875, Notice of Allowance mailed Oct. 4, 2024", 12 pgs.
"European Application Serial No. 21791175.9 , Response to Communication Pursuant to Rules 161 and 162 EPC Filed Sep. 28, 2023", 23 pgs.

\* cited by examiner

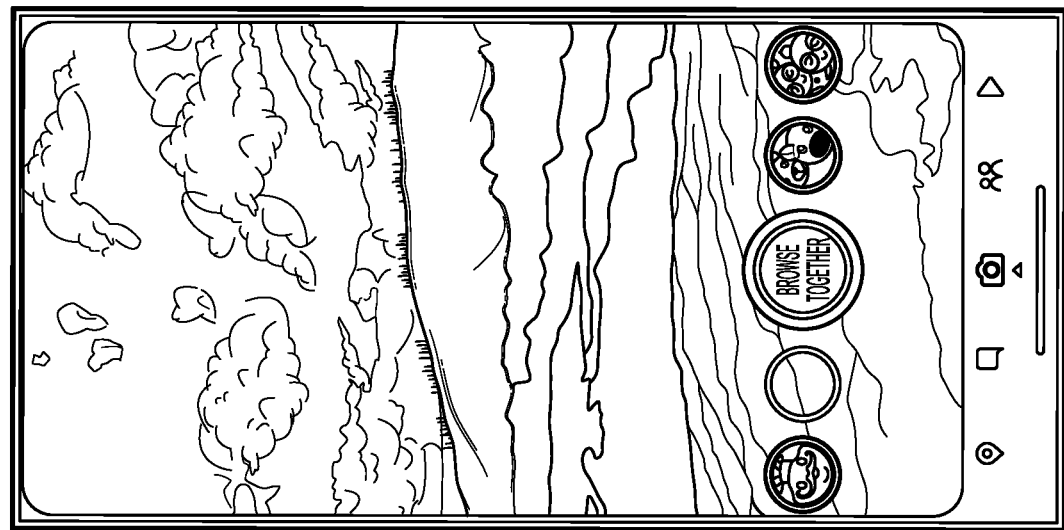
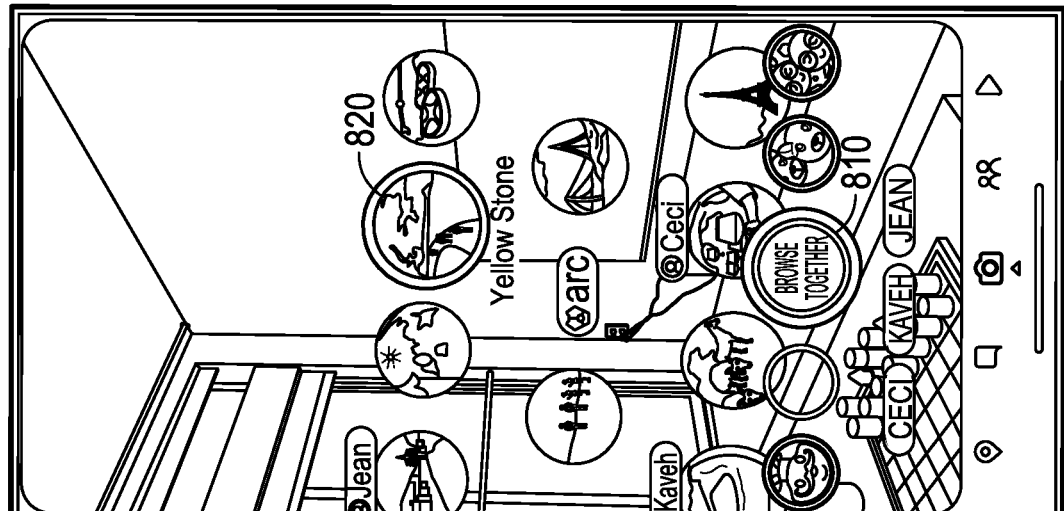
FIG. 8

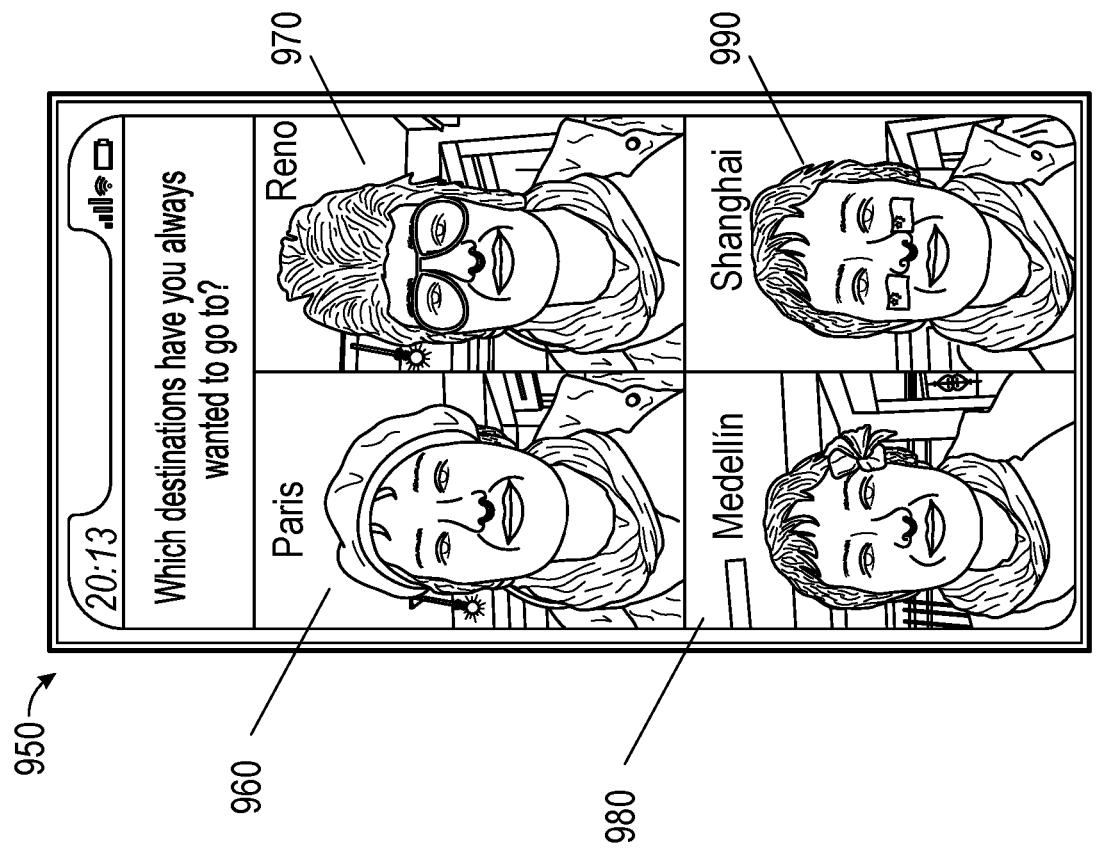
FIG. 9

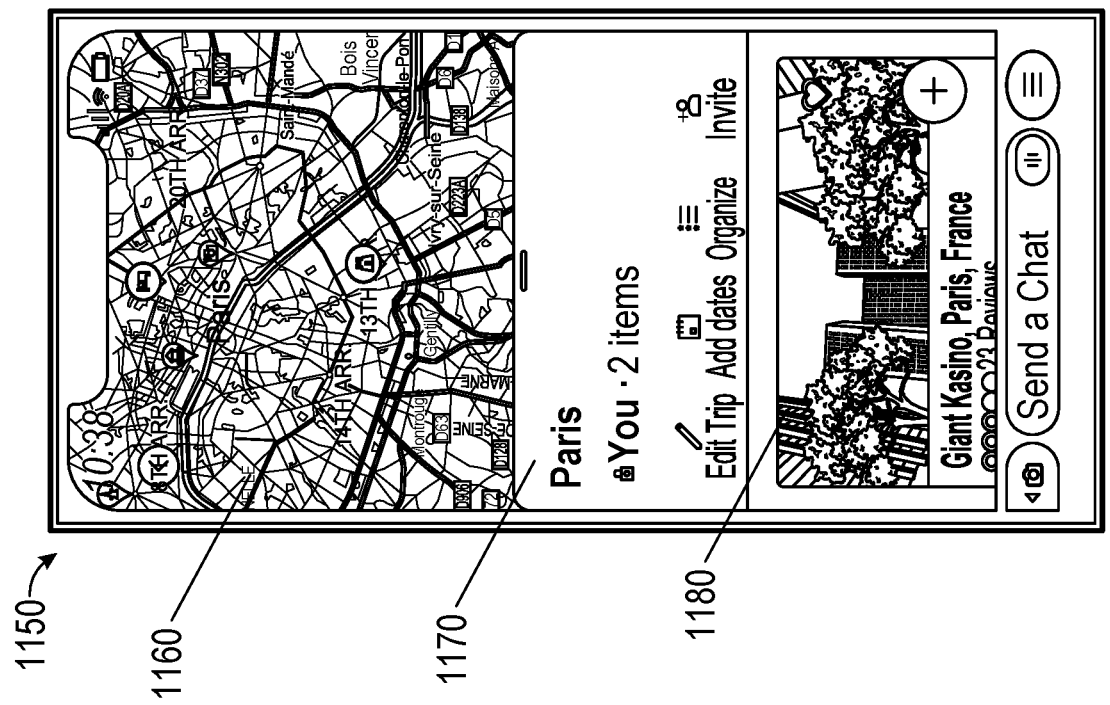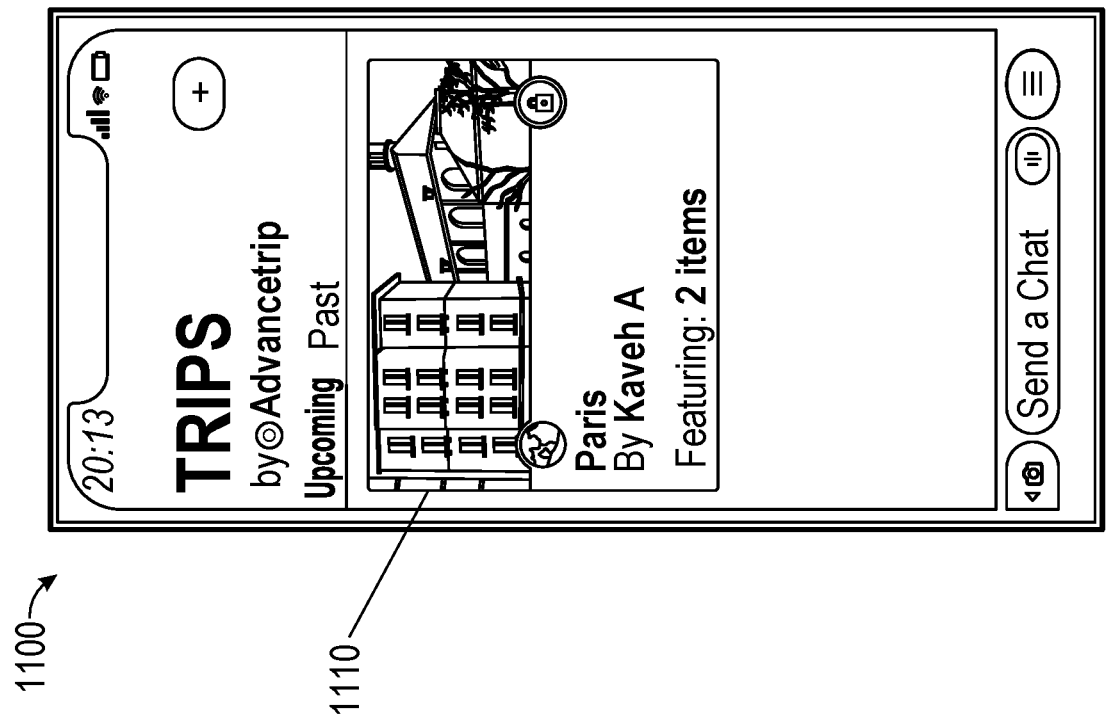
FIG. 11

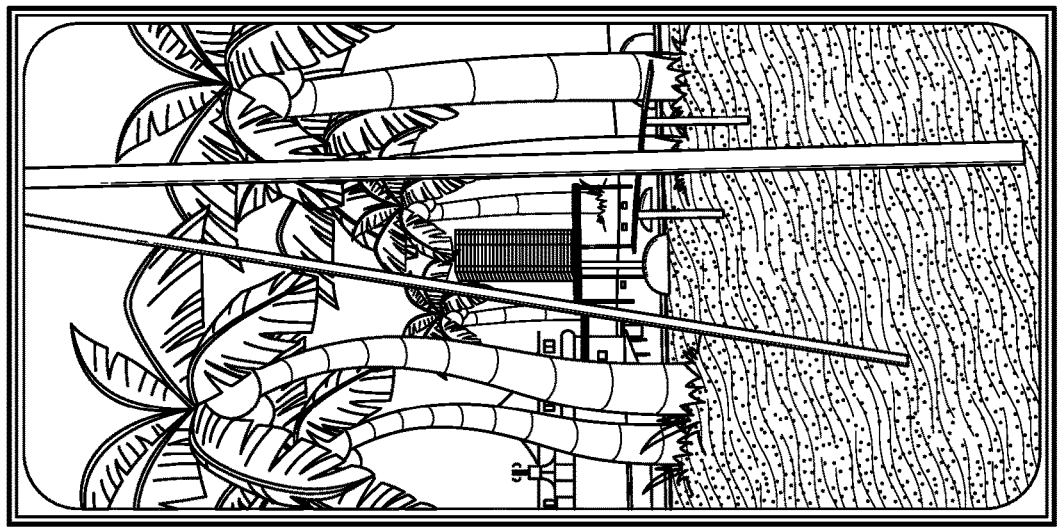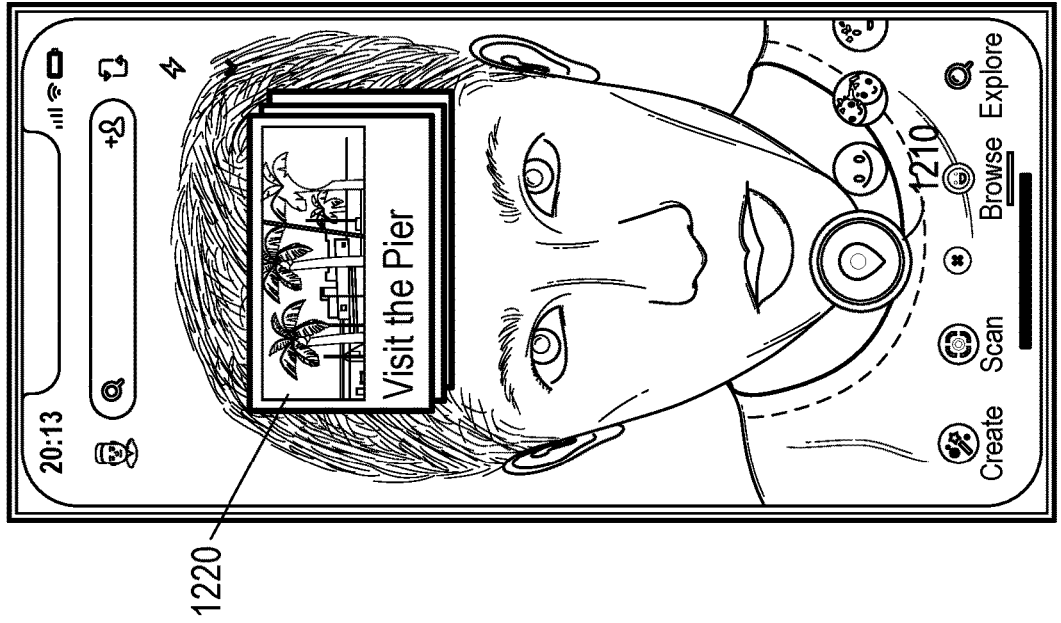
FIG. 12

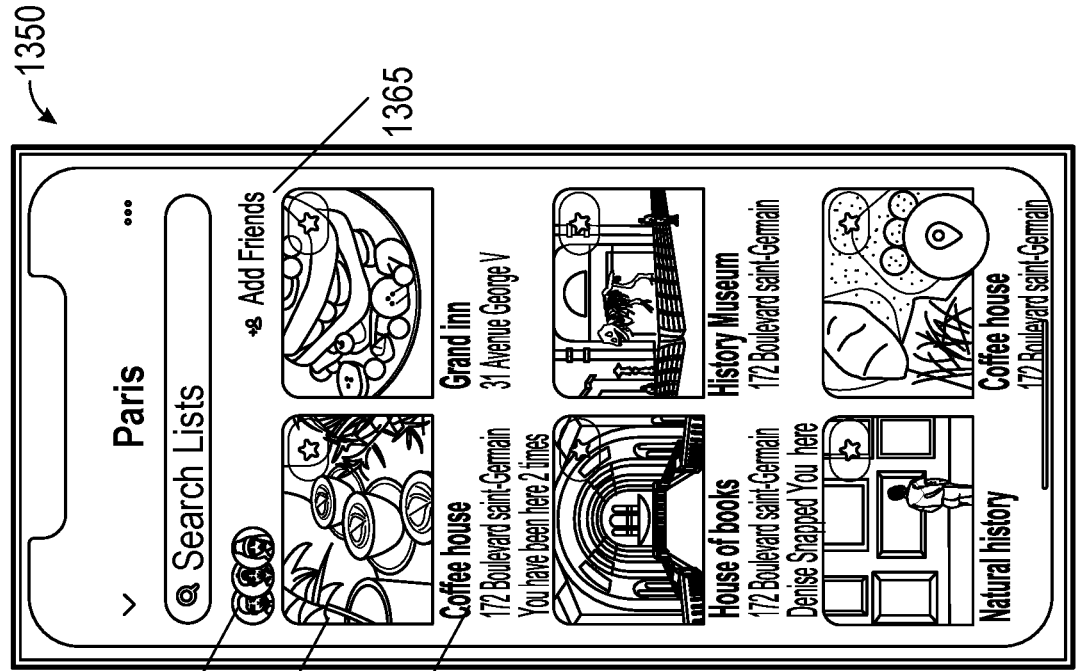
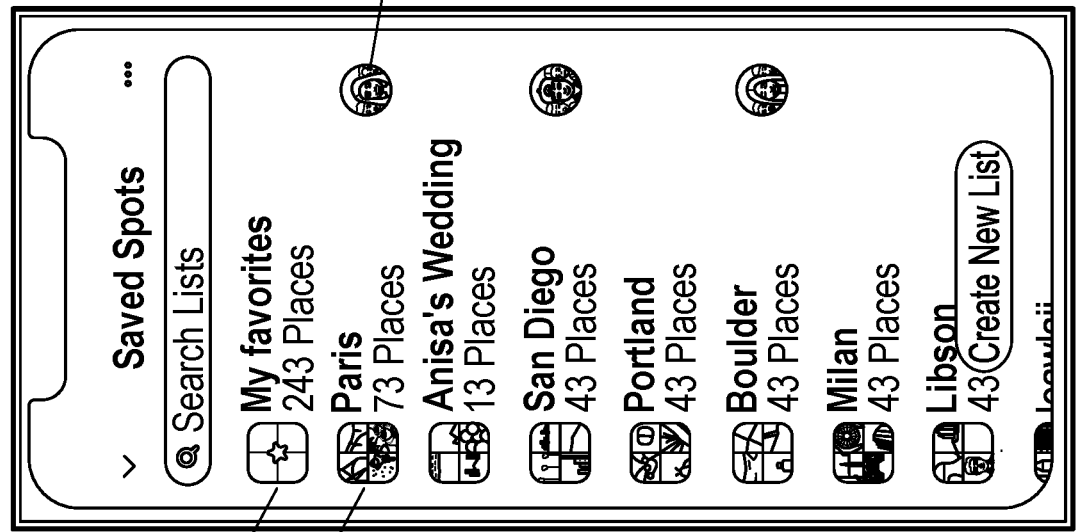
FIG. 13

1400

SELECT A SET OF AUGMENTED REALITY CONTENT GENERATORS FROM A PLURALITY OF AVAILABLE AUGMENTED REALITY CONTENT GENERATORS, EACH OF THE SELECTED SET OF AUGMENTED REALITY CONTENT GENERATORS COMPRISING AT LEAST ONE AUGMENTED REALITY CONTENT GENERATOR FOR PRESENTING A THREE-DIMENSIONAL (3D) SCENE BASED AT LEAST IN PART ON A GEOLOCATION
1402

CAUSE DISPLAY OF A GRAPHICAL INTERFACE COMPRISING A PLURALITY OF SELECTABLE GRAPHICAL ITEMS
1404

RECEIVE, AT A CLIENT DEVICE, A SELECTION OF A FIRST SELECTABLE GRAPHICAL ITEM FROM THE PLURALITY OF SELECTABLE GRAPHICAL ITEMS
1406

CAUSE DISPLAY, AT THE CLIENT DEVICE, AT LEAST ONE AUGMENTED CONTENT REALITY ITEM GENERATED BY THE FIRST AUGMENTED REALITY CONTENT GENERATOR
1408

CAUSE DISPLAY, AT A SECOND CLIENT DEVICE, THE AT LEAST ONE AUGMENTED CONTENT REALITY ITEM GENERATED BY THE FIRST AUGMENTED REALITY CONTENT GENERATOR, THE AT LEAST ONE AUGMENTED CONTENT REALITY ITEM COMPRISING THE 3D SCENE BASED AT LEAST IN PART ON THE PARTICULAR GEOLOCATION
1410

CAUSE, AT A CLIENT DEVICE, DISPLAY OF A GRAPHICAL INTERFACE COMPRISING A PLURALITY OF SELECTABLE GRAPHICAL ITEMS, EACH SELECTABLE GRAPHICAL ITEM CORRESPONDING TO A RESPECTIVE CONTENT ITEM ASSOCIATED WITH A DIFFERENT GEOLOCATION
1702

RECEIVE, AT THE CLIENT DEVICE, A SELECTION OF A FIRST SELECTABLE GRAPHICAL ITEM FROM THE PLURALITY OF SELECTABLE GRAPHICAL ITEMS, THE FIRST SELECTABLE GRAPHICAL ITEM CORRESPONDING TO A PARTICULAR GEOLOCATION
1704

CAUSE DISPLAY, AT THE CLIENT DEVICE, A SECOND PLURALITY OF SELECTABLE GRAPHICAL ITEMS, EACH OF THE SECOND PLURALITY OF SELECTABLE GRAPHICAL ITEMS CORRESPONDING TO A PARTICULAR SECOND GEOLOCATION OF AN ACTIVITY OR PLACE OF BUSINESS WITHIN A GEOGRAPHICAL AREA ASSOCIATED WITH THE PARTICULAR GEOLOCATION
1706

FIG. 17

INTERFACES TO ORGANIZE AND SHARE LOCATIONS AT A DESTINATION GEOLOCATION IN A MESSAGING SYSTEM

PRIORITY CLAIM

This application is a continuation of U.S. patent application Ser. No. 17/147,008, filed Jan. 12, 2021, which application claims the benefit of priority of U.S. Provisional Patent Application No. 63/085,984, filed Sep. 30, 2020, which are hereby incorporated by reference herein in their entireties for all purposes.

BACKGROUND

With the increased use of digital images, affordability of portable computing devices, availability of increased capacity of digital storage media, and increased bandwidth and accessibility of network connections, digital images have become a part of the daily life for an increasing number of people.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates examples of an augmented reality (AR) content generator, and presenting AR content items generated by the AR content generator in the messaging client application (or the messaging system).

FIG. 9 illustrates examples of an augmented reality (AR) content generator, and presenting AR content items generated by an AR content generator in the messaging client application (or the messaging system), according to some embodiments.

FIG. 11 illustrates examples of an augmented reality (AR) content generator, and presenting AR content items generated by an AR content generator in the messaging client application (or the messaging system), according to some embodiments.

FIG. 12 illustrates examples of an augmented reality (AR) content generator, and presenting AR content items generated by the AR content generator in the messaging client application (or the messaging system), according to some embodiments.

FIG. 13 illustrates examples of user interfaces, and presenting content items generated by an AR content generator in the messaging client application (or the messaging system), according to some embodiments.

FIG. 14 is a flowchart illustrating a method, according to certain example embodiments.

FIG. 17 is a flowchart illustrating a method, according to certain example embodiments.

DETAILED DESCRIPTION

Figure 1:
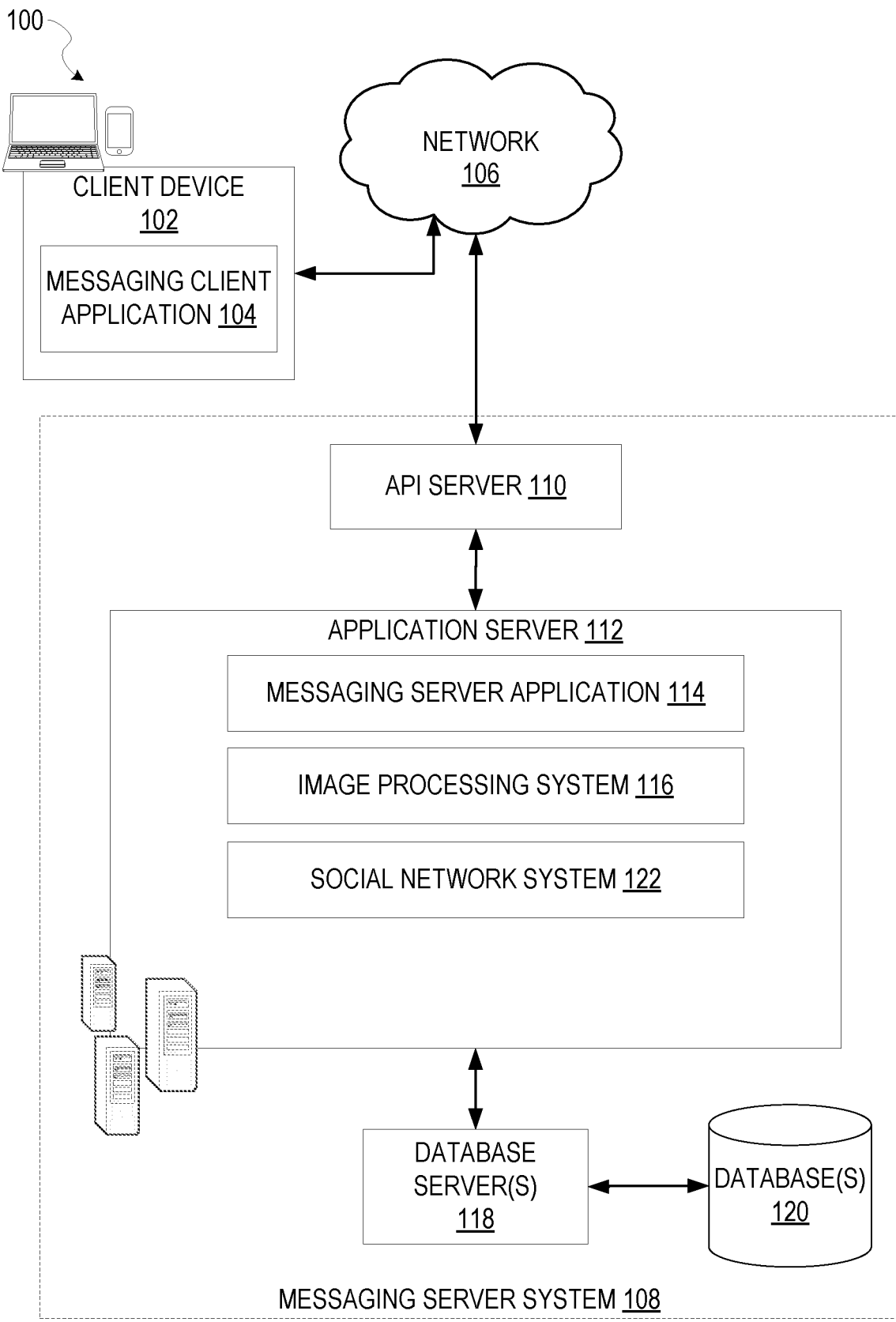
FIG. 1 is a diagrammatic representation of a networked environment in which the present disclosure may be deployed, in accordance with some example embodiments.

Users with a range of interests from various locations can capture digital images of various subjects and make captured images available to others via networks, such as the Internet. To enhance users' experiences with digital images and provide various features, enabling computing devices to perform image processing operations on various objects and/or features captured in a wide range of changing conditions (e.g., changes in image scales, noises, lighting, movement, or geometric distortion) can be challenging and computationally intensive.

Augmented reality (AR) experiences can be provided in a messaging client application (or the messaging system) as described in embodiments herein. However, in some instances, such AR experiences are isolated to a single user experience in which AR content items are rendered for display to a single client device corresponding to a single user. Thus, to increase activity and engagement with the messaging platform provided by the subject technology, the subject technology provides a shared (or group) experience in which AR content items are provided in conjunction with a group of users. More specifically, the subject technology enables a shared group experience involving AR experiences in connection with travel activity (e.g., destination geolocations, travel planning, travel activities, and the like).

Thus, the subject technology is understood to advantageously provide technical improvements in presenting AR content items in connection with one or more geolocations which can be different from a current geolocation of respective computing devices associated with a group of users. Such geolocations can be rendered for display using AR content items to enable interaction by the group of users, where each interaction by a given user can be observed by at least one other user from the group in a manner to facilitate a natural and intuitive presentation of AR content (e.g., without lag and dropping frames due to graphical bottlenecks and inefficient processing of AR content) and thereby increase a sense of presence in an environment including a mixture of (real) physical items and AR content items.

In an example, the technical improvements also involve utilizing server or remote computing resources to process and render AR content, while in yet another example, AR content can be rendered by a given computing device and then propagated to other computing devices for presentation utilizing a peer to peer network, local network, or short distance network depending on the physical distance between each respective device associated with the group of users. Through the combination and utilization of various techniques described herein, a latency of displaying AR content items (e.g., a duration of time(s) for the AR content to be generated and subsequently rendered on the respective displays of each device from the group of users) can be reduced, in comparison with other existing implementations, to provide a more immersive and compelling user experience.

As discussed further herein, the subject infrastructure supports the creation and sharing of interactive media, referred to herein as messages including 3D content or AR effects, throughout various components of a messaging system. In example embodiments described herein, messages can enter the system from a live camera or via from storage (e.g., where messages including 3D content and/or AR effects are stored in memory or a database). The subject system supports motion sensor input, and loading of external effects and asset data.

As described herein, a message includes an interactive image. In an example embodiment, a message is rendered using the subject system to visualize the spatial detail/geometry of what the camera sees, in addition to a traditional image texture. When a viewer interacts with this message by moving the client device, the movement triggers corresponding changes in the perspective the image and geometry are rendered at to the viewer.

As referred to herein, the phrase "augmented reality experience," "augmented reality content item," "augmented reality content generator" includes or refers to various image processing operations corresponding to an image modification, filter, Lenses, media overlay, transformation, and the like, as described further herein.

FIG. 1 is a block diagram showing an example messaging system 100 for exchanging data (e.g., messages and associated content) over a network. The messaging system 100 includes multiple instances of a client device 102, each of which hosts a number of applications including a messaging client application 104. Each messaging client application 104 is communicatively coupled to other instances of the messaging client application 104 and a messaging server system 108 via a network 106 (e.g., the Internet).

A messaging client application 104 is able to communicate and exchange data with another messaging client application 104 and with the messaging server system 108 via the network 106. The data exchanged between messaging client application 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

Figure 3:
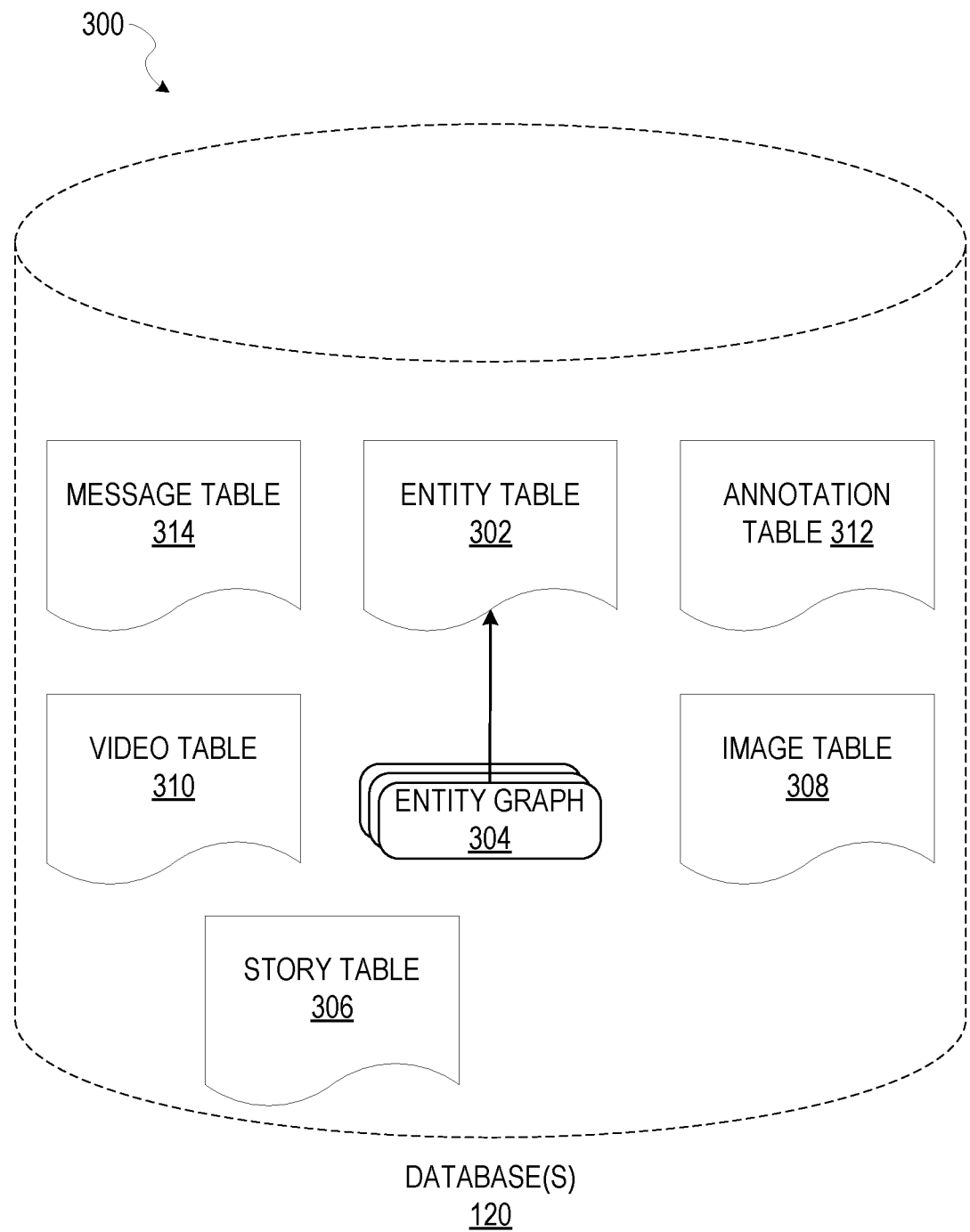
FIG. 3 is a diagrammatic representation of a data structure as maintained in a database, in accordance with some example embodiments.

The social network system 122 supports various social networking functions services, and makes these functions and services available to the messaging server application 114. To this end, the social network system 122 maintains and accesses an entity graph 304 (as shown in FIG. 3) within the database 120. Examples of functions and services supported by the social network system 122 include the identification of other users of the messaging system 100 with which a particular user has relationships or is 'following', and also the identification of other entities and interests of a particular user.

The application server 112 is communicatively coupled to a database server 118, which facilitates access to a database 120 in which is stored data associated with messages processed by the messaging server application 114.

Figure 2:
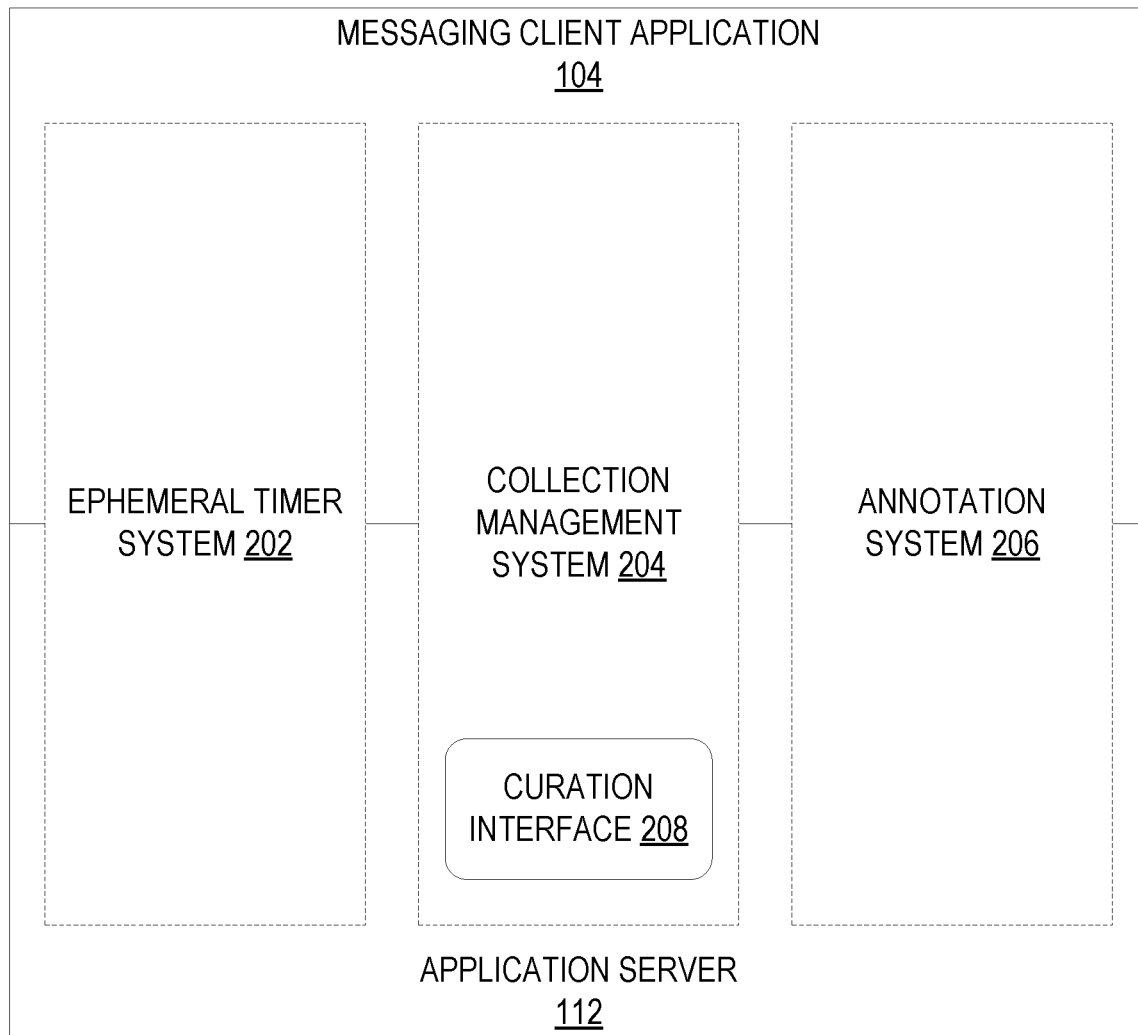
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an 'event gallery' or an 'event story.' Such a collection may be made available for a specified time period, such as the duration of an event to which the content relates. For example, content relating to a music concert may be made available as a 'story' for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filer is a data filer, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102, or the current time.

Other annotation data that may be stored within the image table 308 are augmented reality content generators (e.g., corresponding to applying Lenses, augmented reality experiences, or augmented reality content items). An augmented reality content generator may be a real-time special effect and sound that may be added to an image or a video.

As described above, augmented reality content generators, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content generators, a user can use a single video clip with multiple augmented reality content generators to see how the different augmented reality content generators will modify the stored clip. For example, multiple augmented reality content generators that apply different pseudorandom movement models can be applied to the same content by selecting different augmented reality content generators for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content generators will look within different windows in a display at the same time. This can, for example, enable multiple windows with different pseudorandom animations to be viewed on a display at the same time.

Data and various systems using augmented reality content generators or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content generators thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different augmented reality experiences (e.g., AR content generators) to be applied in corresponding different layers. Such a graphical processing pipeline provides an extensible rendering engine for providing multiple augmented reality experiences that are included in a composite media (e.g., image or video) for rendering by the messaging client application 104 (or the messaging system 100).

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for which a record is maintained in the entity table 302). A user may create a 'personal story' in the form of a collection of content that has been created and sent/broadcast by that user. To this end, the user interface of the messaging client application 104 may include an icon that is user-selectable to enable a sending user to add specific content to his or her personal story.

A collection may also constitute a 'live story,' which is a collection of content from multiple users that is created manually, automatically, or using a combination of manual and automatic techniques. For example, a 'live story' may constitute a curated stream of user-submitted content from varies locations and events. Users whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a 'live story' told from a community perspective.

A further type of content collection is known as a 'location story', which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
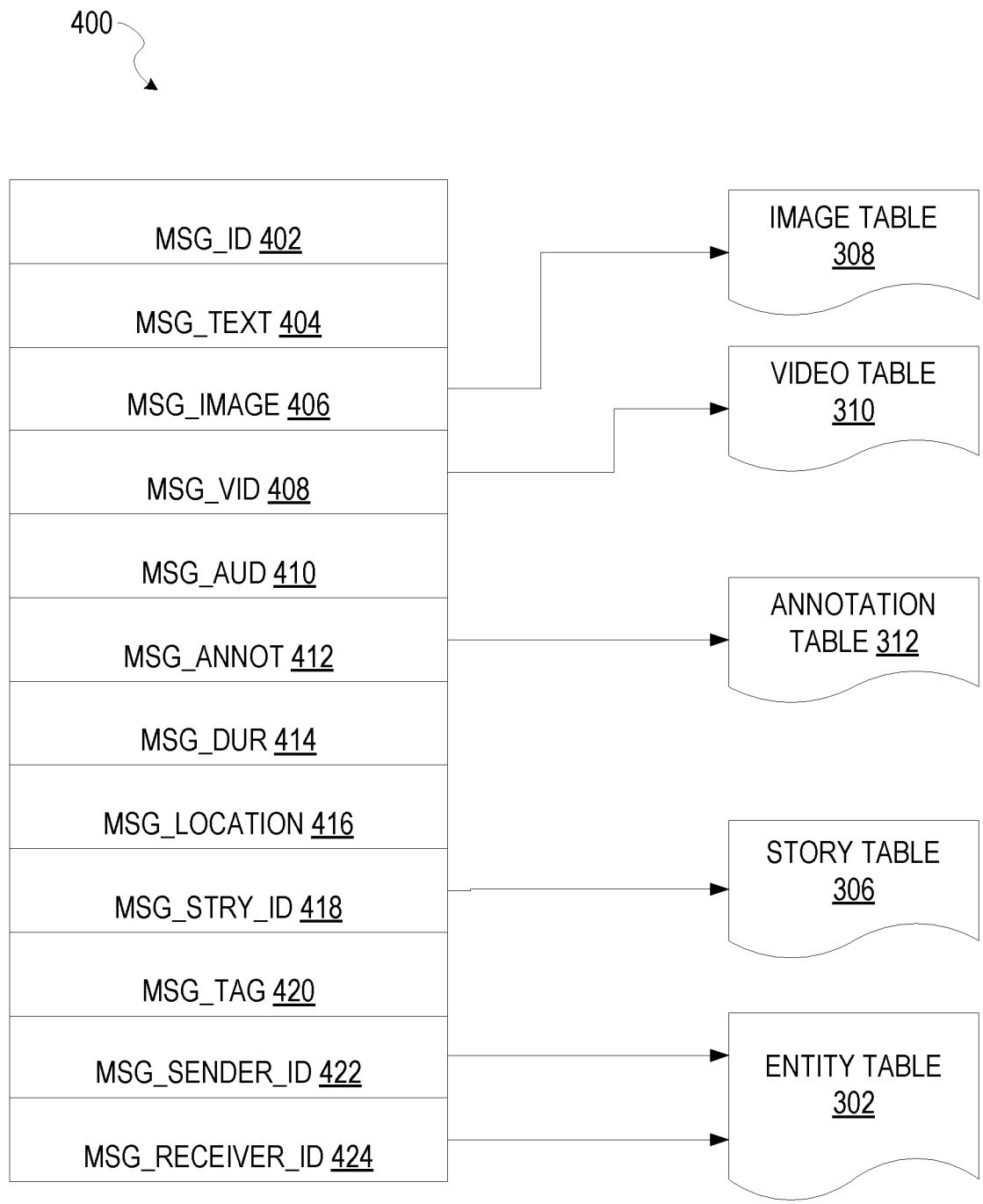
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as 'in-transit' or 'in-flight' data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of a client device 102 or retrieved from a memory component of a client device 102, and that is included in the message 400.

A message video payload 408: video data, captured by a camera component or retrieved from a memory component of the client device 102 and that is included in the message 400.

A message audio payload 410: audio data, captured by a microphone or retrieved from a memory component of the client device 102, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 104.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., 'stories') with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
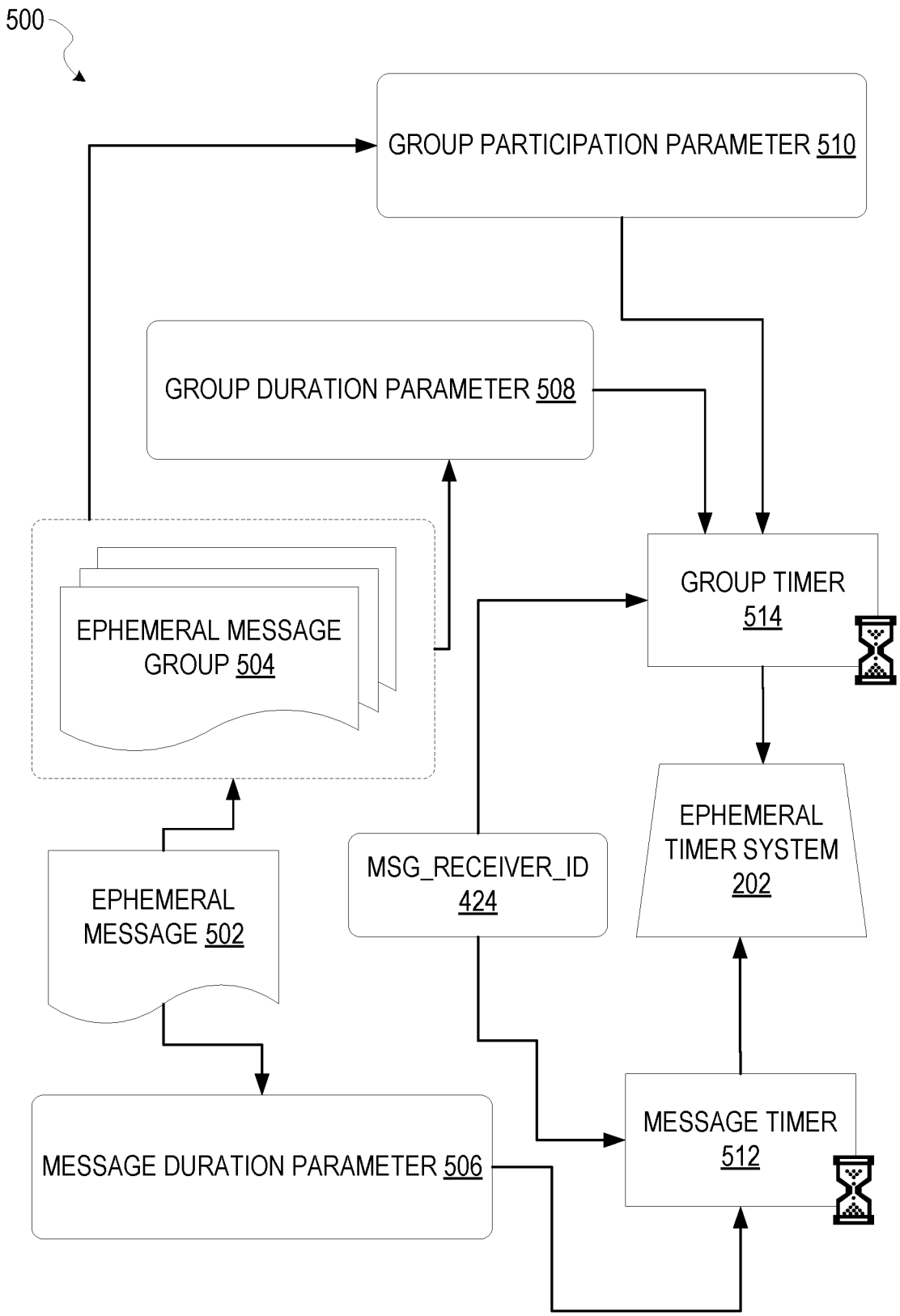
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may 'expire' and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

As described above, media overlays, such as Lenses, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple media overlays (e.g., Lenses), a user can use a single video clip with multiple Lenses to see how the different Lenses will modify the stored clip. For example, multiple Lenses that apply different pseudorandom movement models can be applied to the same content by selecting different Lenses for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different Lenses will look within different windows in a display at the same time. This can, for example, enable multiple windows with different pseudorandom animations to be viewed on a display at the same time.

Data and various systems to use Lenses or other such transform systems to modify content using this data can thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g. images or frames of video). Lens data thus refers both to the images, models, and textures used to create transformations in content, as well as to additional modeling and analysis information needed to achieve such transformations with object detection, tracking, and placement.

Real time video processing can be performed with any kind of video data, (e.g. video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g. using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve: changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g. Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g. if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device and perform complex image manipulations locally on a client device such as client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on a client device.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g. initiation from a content creator user interface). In various embodiments, a modification may be persistent after an initial selection of a modification icon. The user may toggle the modification on or off by tapping or otherwise selecting the face being modified by the transformation system. and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

In some example embodiments, a graphical processing pipeline architecture is provided that enables different media overlays to be applied in corresponding different layers. Such a graphical processing pipeline provides an extensible rendering engine for providing multiple augmented reality content generators that are included in a composite media (e.g., image or video) for rendering by the messaging client application 104 (or the messaging system 100).

As discussed herein, the subject infrastructure supports the creation and sharing of interactive messages with interactive effects throughout various components of the messaging system 100. In an example, to provide such interactive effects, a given interactive message may include image data along with 2D data, or 3D data. The infrastructure as described herein enables other forms of 3D and interactive media (e.g., 2D media content) to be provided across the subject system, which allows for such interactive media to be shared across the messaging system 100 and alongside photo and video messages. In example embodiments described herein, messages can enter the system from a live camera or via from storage (e.g., where messages with 2D or 3D content or augmented reality (AR) effects (e.g., 3D effects, or other interactive effects are stored in memory or a database). In an example of an interactive message with 3D data, the subject system supports motion sensor input and manages the sending and storage of 3D data, and loading of external effects and asset data.

As mentioned above, an interactive message includes an image in combination with a 2D effect, or a 3D effect and depth data. In an example embodiment, a message is rendered using the subject system to visualize the spatial detail/geometry of what the camera sees, in addition to a traditional image texture. When a viewer interacts with this message by moving a client device, the movement triggers corresponding changes in the perspective the image and geometry are rendered at to the viewer.

In an embodiment, the subject system provides AR effects (which may include 3D effects using 3D data, or interactive 2D effects that do not use 3D data) that work in conjunction with other components of the system to provide particles, shaders, 2D assets and 3D geometry that can inhabit different 3D-planes within messages. The AR effects as described herein, in an example, are rendered in a real-time manner for the user.

As mentioned herein, a gyro-based interaction refers to a type of interaction in which a given client device's rotation is used as an input to change an aspect of the effect (e.g., rotating phone along x-axis in order to change the color of a light in the scene).

As mentioned herein, an augmented reality content generator refers to a real-time special effect and/or sound that may be added to a message and modifies image and/or 3D data with an AR effects and/other 3D content such as 3D animated graphical elements, 3D objects (e.g., non-animated), and the like.

The following discussion relates to example data that is stored in connection with such a message in accordance to some embodiments.

Figure 6:
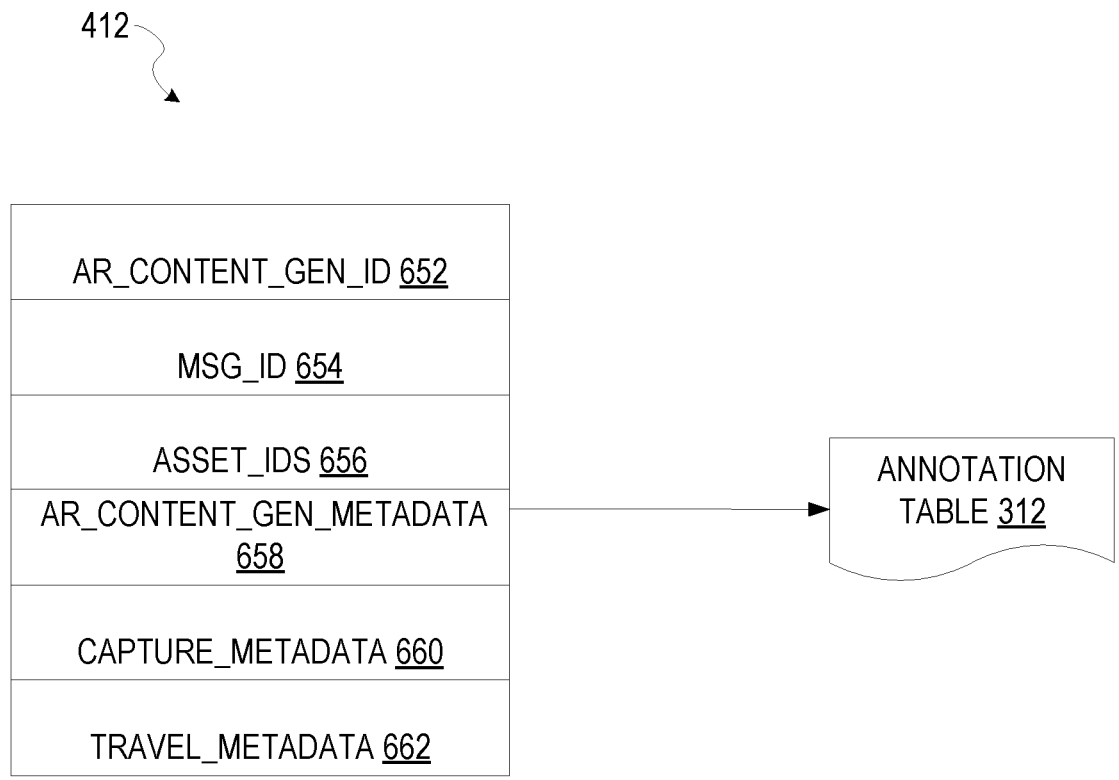
FIG. 6 is a schematic diagram illustrating a structure of the message annotations, as described in FIG. 4, including additional information corresponding to a given message, according to some embodiments.

FIG. 6 is a schematic diagram illustrating a structure of the message annotations 412, as described above in FIG. 4, including additional information corresponding to a given message, according to some embodiments, generated by the messaging client application 104.

Figure 7:
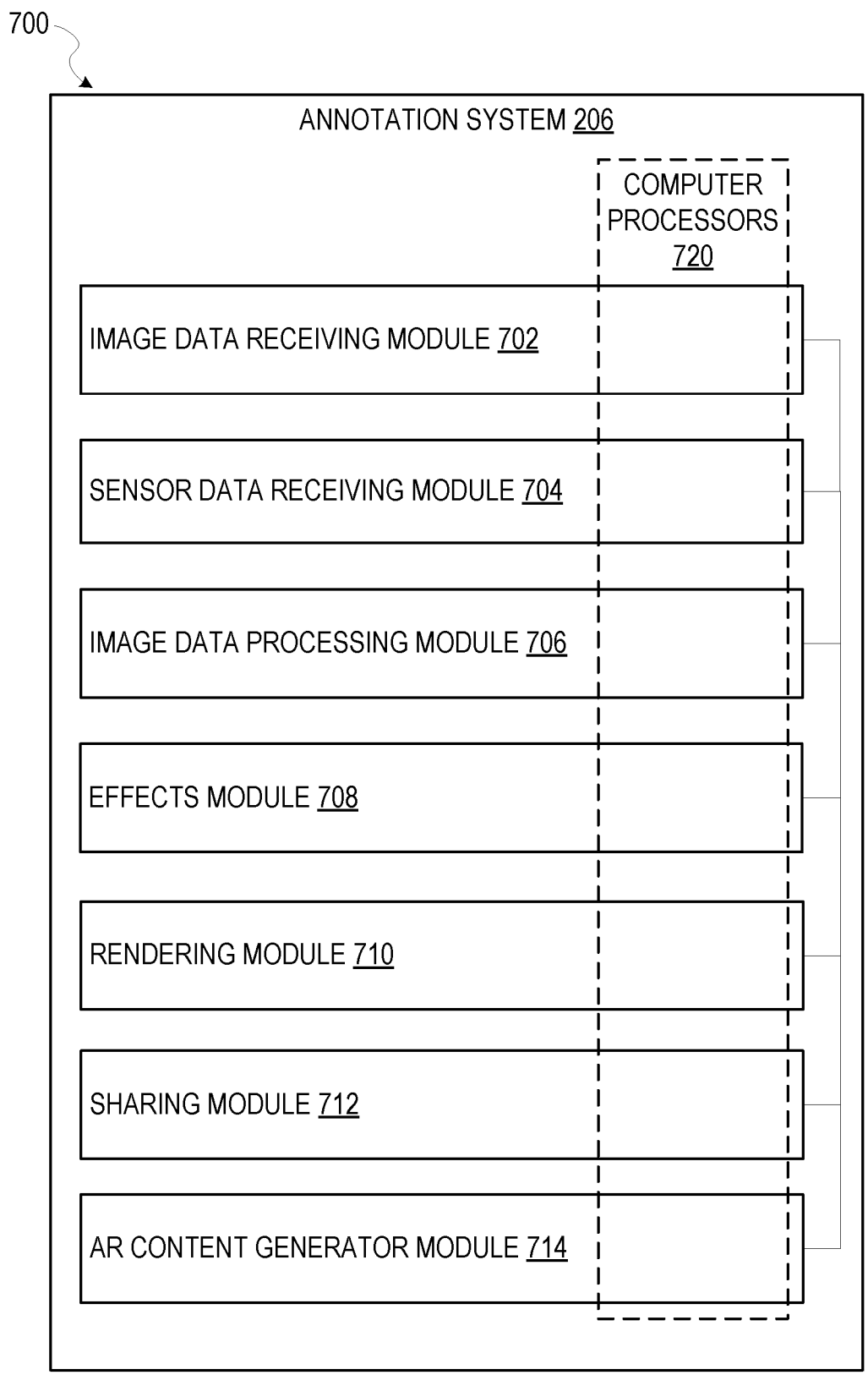
FIG. 7 is a block diagram illustrating various modules of an annotation system, according to certain example embodiments.

In an embodiment, the content of a particular message 400, as shown in FIG. 3, including the additional data shown in FIG. 6 is used to populate the message table 314 stored within the database 120 for a given message, which is then accessible by the messaging client application 104. As illustrated in FIG. 6, message annotations 412 includes the following components corresponding to various data:

augmented reality (AR) content identifier 652: identifier of an AR content generator utilized in the message
message identifier 654: identifier of the message
asset identifiers 656: a set of identifiers for assets in the message. For example, respective asset identifiers can be included for assets that are determined by the particular AR content generator. In an embodiment, such assets are created by the AR content generator on the sender side client device, uploaded to the messaging server application 114, and utilized on the receiver side client device in order to recreate the message. Examples of typical assets include:
The original still RGB image(s) captured by the camera
The post-processed image(s) with AR content generator effects applied to the original image
augmented reality (AR) content metadata 658: additional metadata associated with the AR content generator corresponding to the AR identifier 652, such as:
AR content generator category: corresponding to a type or classification for a particular AR content generator
AR content generator carousel index
carousel group: This can be populated and utilized when eligible post-capture AR content generators are inserted into a carousel interface. In an implementation, a new value "TRAVEL AR DEFAULT GROUP" (e.g., a default group assigned to a travel-related AR content generator can be added to the list of valid group names, and travel-related AR content generators can be included this group.

capture metadata 660 corresponding to additional metadata, such as:
  camera image metadata
    camera intrinsic data
      focal length
      principal point
    other camera information (e.g., camera position)
  sensor information
    gyroscopic sensor data
    position sensor data
    accelerometer sensor data
    other sensor data
    location sensor data travel metadata 662 corresponding to additional metadata, such as:
  geolocation information of a particular destination geolocation(s)
  user profile information related to travel preferences and interests
  social graph information related to other users that are interested in traveling, or to be included in (group) travel planning FIG. 7 is a block diagram 700 illustrating various modules of an annotation system 206, according to certain example embodiments. The annotation system 206 is shown as including an image data receiving module 702, a sensor data receiving module 704, an image data processing module 706, an augmented reality (AR) effects module 708, a rendering module 710, and a sharing module 712. The various modules of the annotation system 206 are configured to communicate with each other (e.g., via a bus, shared memory, or a switch). Any one or more of these modules may be implemented using one or more computer processors 720 (e.g., by configuring such one or more computer processors to perform functions described for that module) and hence may include one or more of the computer processors 720 (e.g., a set of processors provided by the client device 102).

Any one or more of the modules described may be implemented using hardware alone (e.g., one or more of the computer processors 720 of a machine (e.g., machine 1800) or a combination of hardware and software. For example, any described module of the annotation system 206 may physically include an arrangement of one or more of the computer processors 720 (e.g., a subset of or among the one or more computer processors of the machine (e.g., machine 1800) configured to perform the operations described herein for that module. As another example, any module of the annotation system 206 may include software, hardware, or both, that configure an arrangement of one or more computer processors 720 (e.g., among the one or more computer processors of the machine (e.g., machine 1800) to perform the operations described herein for that module. Accordingly, different modules of the annotation system 206 may include and configure different arrangements of such computer processors 720 or a single arrangement of such computer processors 720 at different points in time. Moreover, any two or more modules of the annotation system 206 may be combined into a single module, and the functions described herein for a single module may be subdivided among multiple modules. Furthermore, according to various example embodiments, modules described herein as being implemented within a single machine, database, or device may be distributed across multiple machines, databases, or devices.

The image data receiving module 702 receives images and depth data captured by a client device 102. For example, an image is a photograph captured by an optical sensor (e.g., camera) of the client device 102. An image includes one or more real-world features, such as a user's face or real-world object(s) detected in the image. In some embodiments, an image includes metadata describing the image.

The sensor data receiving module 704 receives sensor data from a client device 102. Sensor data is any type of data captured by a sensor of the client device 102. In an example, sensor data can include motion of the client device 102 gathered by a gyroscope, touch inputs or gesture inputs from a touch sensor (e.g., touchscreen), GPS, or another sensor of the client device 102 that describes a current geographic location and/or movement of the client device 102. As another example, sensor data may include temperature data indicating a current temperature as detected by a sensor of the client device 102. As another example, the sensor data may include light sensor data indicating whether the client device 102 is in a dark or bright environment.

The image data processing module 706 performs operations on the received image data. For example, various image processing operations are performed by the image data processing module 706, which are discussed further herein.

The AR effects module 708 performs various operations based on algorithms or techniques that correspond to animations and/or providing visual and/or auditory effects to the received image data, which is described further herein. In an embodiment, a given augmented reality content generator can utilize the AR effects module 708 to perform operations to render AR effects (e.g., including 2D effects or 3D effects) and the like.

The rendering module 710 performs rendering of the message for display by the messaging client application 104 based on data provided by at least one of the aforementioned modules. In an example, the rendering module 710 utilizes a graphical processing pipeline to perform graphical operations to render the message for display. The rendering module 710 implements, in an example, an extensible rendering engine which supports multiple image processing operations corresponding to respective augmented reality content generators.

In some implementations, the rendering module 710 provide a graphics system that renders two-dimensional (2D) objects or objects from a three-dimensional (3D) world (real or imaginary) onto a 2D display screen. Such a graphics system (e.g., one included on the client device 102) includes a graphics processing unit (GPU) in some implementations for performing image processing operations and rendering graphical elements for display.

In an implementation, the GPU includes a logical graphical processing pipeline, which can receive a representation of a 2D or 3D scene and provide an output of a bitmap that represents a 2D image for display. Existing application programming interfaces (APIs) have implemented graphical pipeline models. Examples of such APIs include the Open Graphics Library (OPENGL) API and the METAL API. The graphical processing pipeline includes a number of stages to convert a group of vertices, textures, buffers, and state information into an image frame on the screen. In an implementation, one of the stages of the graphical processing pipeline is a shader, which may be utilized as part of a particular augmented reality content generator that is applied to an input frame (e.g., image or video). A shader can be implemented as code running on a specialized processing unit, also referred to as a shader unit or shader processor, usually executing several computing threads, programmed to generate appropriate levels of color and/or special effects to fragments being rendered. For example, a vertex shader processes attributes (position, texture coordinates, color, etc.) of a vertex, and a pixel shader processes attributes (texture values, color, z-depth and alpha value) of a pixel. In some instances, a pixel shader is referred to as a fragment shader.

It is to be appreciated that other types of shader processes may be provided. In an example, a particular sampling rate is utilized, within the graphical processing pipeline, for rendering an entire frame, and/or pixel shading is performed at a particular per-pixel rate. In this manner, a given electronic device (e.g., the client device 102) operates the graphical processing pipeline to convert information corresponding to objects into a bitmap that can be displayed by the electronic device.

The sharing module 712 generates the message for storing and/or sending to the messaging server system 108. The sharing module 712 enables sharing of messages to other users and/or client devices of the messaging server system 108.

The augmented reality content generator module 714 cause display of selectable graphical items that, in an embodiment, are presented in a carousel arrangement. By way of example, the user can utilize various inputs to rotate the selectable graphical items onto and off of the display screen in manner corresponding to a carousel providing a cyclic view of the graphical items. The carousel arrangement allows multiple graphical items to occupy a particular graphical area on the display screen. In an example, augmented reality content generators can be organized into respective groups for including on the carousel arrangement thereby enabling rotating through augmented reality content generators by group.

In embodiments described herein, by using depth and image data, 3D face and scene reconstruction can be performed that adds a Z-axis dimension (e.g., depth dimension) to a traditional 2D photos (e.g., X-axis and Y-axis dimensions). This format enables the viewer to interact with the message, changing the angle/perspective in which the message is rendered by the subject system, and affecting particles and shaders that are utilized in rendering the message.

In an example, viewer interaction input comes from movement (e.g., from a movement sensor of the device displaying the message to the viewer) whilst viewing the message, which in turn is translated to changes in perspective for how content, particles and shaders are rendered. Interaction can also come from onscreen touch gestures and other device motion.

In embodiments of such user interfaces, selectable graphical items may be presented in a carousel arrangement in which a portion or subset of the selectable graphical items are visible on a display screen of a given computing device (e.g., the client device 102). By way of example, the user can utilize various inputs to rotate the selectable graphical items onto and off of the display screen in manner corresponding to a carousel providing a cyclic view of the graphical items. The carousel arrangement as provided in the user interfaces therefore allow multiple graphical items to occupy a particular graphical area on the display screen.

In an example, respective AR experiences corresponding to different AR content generators can be organized into respective groups for including on the carousel arrangement thereby enabling rotating through media overlays by group. Although a carousel interface is provided as an example, it is appreciated that other graphical interfaces may be utilized. For example, a set of augmented reality content generators can include graphical list, scroll list, scroll graphic, or another graphical interface that enables navigation through various graphical items for selection, and the like. As used herein a carousel interface refers to display of graphical items in an arrangement similar to a circular list, thereby enabling navigation, based on user inputs (e.g., touch or gestures), through the circular list to select or scroll through the graphical items. In an example, a set of graphical items may be presented on a horizontal (or vertical) line or axis where each graphical item is represented as a particular thumbnail image (or icon, avatar, and the like). At any one time, some of the graphical items in the carousel interface may be hidden. If the user wants to view the hidden graphical items, in an example, the user may provide a user input (e.g., touch, gesture, and the like) to scroll through the graphical items in a particular direction (e.g., left, right, up, or down, and the like). Afterward, a subsequent view of the carousel interface is displayed where an animation is provided or rendered to present one or more additional graphical items for inclusion on the interface, and where some of the previously presented graphical items may be hidden in this subsequent view. In an embodiment, in this manner the user can navigate through the set of graphical items back and forth in a circular fashion. Thus, it is appreciated that the carousel interface can optimize screen space by displaying only a subset of images from a set of graphical items in a cyclic view.

As described herein, augmented reality content generators can included on the carousel arrangement (or another interface as discussed above) thereby enabling rotating through augmented reality content generators. Further, augmented reality content generators can be selected for inclusion based on various signals including, for example, time, date, geolocation, metadata associated with the media content, and the like. In the carousel arrangement of the user interface examples of FIG. 8, respective augmented reality content generators are selected from available augmented reality content generators provided by the subject system.

FIG. 8 illustrates examples of an augmented reality (AR) content generator, and presenting AR content items generated by the AR content generator in the messaging client application 104 (or the messaging system 100), according to some embodiments.

In the examples of FIG. 8, augmented reality content generator 810, corresponding to a selectable graphical item, provides augmented reality experiences with AR content items (e.g., 3D or 2D objects rendered for display in the messaging client application 104) corresponding to respective travel destinations. In an example, a scene can be populated with particular AR content items (e.g., 3D or 2D objects) based on destinations that a given user and other users (e.g., friends connected with or included in a given user's social graph) have shown interest (e.g., based on user activity or profile). Further, selection of a particular AR corresponding to a travel destination (e.g., destination geolocation different than a current geolocation of the client device 102) causes a display of a 3D scene such as a 3D virtual map of a scene in the destination (e.g., Eiffel tower, or some significant location, monument, or landmark, and the like).

In the following discussion, a first set of selectable graphical items correspond to respective augmented reality content generators. As illustrated in user interface 800, selectable graphical items, corresponding to a carousel arrangement, includes a selectable graphical item, corresponding to an augmented reality content generator 810, in the display screen of an electronic device (e.g., the client device 102). For example, a swipe gesture is received via a touch screen of the client device 102, and in response to receiving the swipe gesture, navigation through the selectable graphical items is enabled to facilitate selection of a particular augmented reality content generator. The selectable graphical item, corresponding to augmented reality content generator 810, is selected via a touch input (e.g., tap, or through a touch release at the end of the gesture) by the user. In this example, the selectable graphical item corresponds to a particular augmented reality content generator for providing AR experiences with other users to browse destination geolocations (e.g., for a potential travel destination or vacation).

Upon selection of the selectable graphical item, corresponding to augmented reality content generator 810, as further shown in user interface 800, graphical items corresponding to user names (e.g., "Ceci", "Kaveh", and "Jean") are included to indicate the users that are to participate in a shared viewing experience provided by augmented reality content generator 810 corresponding to the selectable graphical item. Although three users are shown in this example, it is appreciated that any number of other users can be included. The AR content generator, in this example, generates selectable AR content items including 3D objects that are rendered in a current view of a camera provided by the client device 102. In an example, each 3D object corresponds to a particular destination geolocation (e.g., Yellow Stone, Paris, etc.). To select a set of destination geolocation for rendering the set of 3D objects, information from a user profile(s) can be processed, where such information can indicate desired travel destinations, interests, and the like. Moreover, such user profile information can be based on history geolocation information including places in which a given user may not have yet travel to, or geolocations that the user has explicitly indicated a travel interest. In another example, interest in a particular geolocation can be inferred based at least in part on user activity within the messaging client application 104 such as which AR content generators that a user has used or selected before, products that the user has purchased or viewed, links that the user has visited, or content (e.g., video or images) that the user has viewed on a prior period of time.

As shown in user interface 800, each of the 3D object can be rendered in respective positions of a particular arrangement. Examples of such an arrangement can include a grid-like positioning of each 3D object where each object is spaced at a equal distance from an adjacent 3D object to such that a first set of parallel lines would intersect a subset of the 3D objects, and a second set of parrilla lines would be perpendicular to the first set of parallel lines. Other types of arrangements for rendering the 3D objects are contemplated such as a random arrangement (e.g., where each distance between each of the 3D objects is randomly determined), or any arbitrary configuration based on a polygon or shape (e.g., star, circle, hexagon, and the like).

In a second example of FIG. 8, upon selection of the selectable graphical item, corresponding to an augmented reality content generator 820, a 3D scene, included in a 3D environment, corresponding to a destination geolocation is rendered for display in user interface 850 on the client device 102. The three users discussed above (e.g., "Ceci", "Kaveh", and "Jean") can navigate, as a shared AR experience, through the 3D scene through inputs such as various gesture inputs, movement of the client device 102 (e.g., motion data from a gyroscopic sensor), which causes a view of the 3D scene to be updated (e.g., re-rendered) in response to newly received input or movement data which can change the perspective of the scene that is being viewed by the viewer.

In another example, another user can provide movement or inputs to the receiving client device, which in response, initiates a re-rendering of the 3D environment in which the perspective of the 3D scene that is being viewed by each of the viewers is changed based on the provided movement or inputs. In this manner, different users can navigate through the 3D environment and changes the view of the 3D scene and a shared AR experience can be provided at a selected destination geolocation for travel. For example, upon receiving a touch input, a different portion of the 3D scene can be rendered and displayed on the client device 102.

FIG. 9 illustrates examples of an augmented reality (AR) content generator, and presenting AR content items generated by an AR content generator in the messaging client application 104 (or the messaging system 100), according to some embodiments.

In the examples of FIG. 9, augmented reality content generator 910, corresponding to a selectable graphical item, provides augmented reality experiences with AR content items (e.g., 3D or 2D objects rendered for display in the messaging client application 104) for determining travel locations with other users on the platform. The selectable graphical item, corresponding to augmented reality content generator 910, is selected via a touch input (e.g., tap, or through a touch release at the end of the gesture) by the user.

As illustrated in user interface 900, a scene can be rendered to display particular AR content items (e.g., 3D or 2D objects) based on destinations that a given user has shown interest (e.g., based on user activity or profile). In another embodiment, the particular AR content can be selected using other signals e.g., such a predetermined number of destination geolocations, a number based on a function with respect to an amount of available display size (e.g., more geolocations can be selected the larger the display size), a random selection of a number of destination geolocations, selection based on aggregate popularity from aggregate user activity (e.g., friends or other users, and users connected to each other in a social graph), or other selection basis include any combination of the foregoing.

As shown, user interface 950 is segmented into different portions with a different AR content item in each portion corresponding to a respective travel location. In this example, user interface 950 includes AR content item 960, AR content item 970, AR content item 980, AR content item 990, each of which may be user selectable, corresponding to four different destination geolocations, which may also include textual information describing the particular destination geolocation of the AR content item. In an embodiment, each of the AR content items is generated using a respective AR content generator in a portion of the display of the client device (e.g., client device 102) such that it is possible that multiple AR content generators provide different AR content items in user interface 950. As mentioned above, the destination geolocations can be selected using different signals and provided for display in user interface 950. A user input can be select one of the AR content items, such as a touch input (e.g., tap, or through a touch release at the end of the gesture) by the user. Moreover, each of the AR content items in user interface 950 may response to movement from the client device (e.g., the client device 102) such that in response to movement, the AR content items are re-rendered and updated with respect to the movement. For example, different AR effects and other graphical or auditory effects can be provided in response to such movement.

In an embodiment, upon selection of the AR content item of a particular destination geolocation, a second user interface (e.g., calendar view) is provided to enable the user to select time periods that the user is able to travel, and yet another third user interface provides selectable graphical items (e.g., options) for booking travel related activities (e.g. from third party travel site or service) which is discussed further below in FIG. 10.

Figure 10:
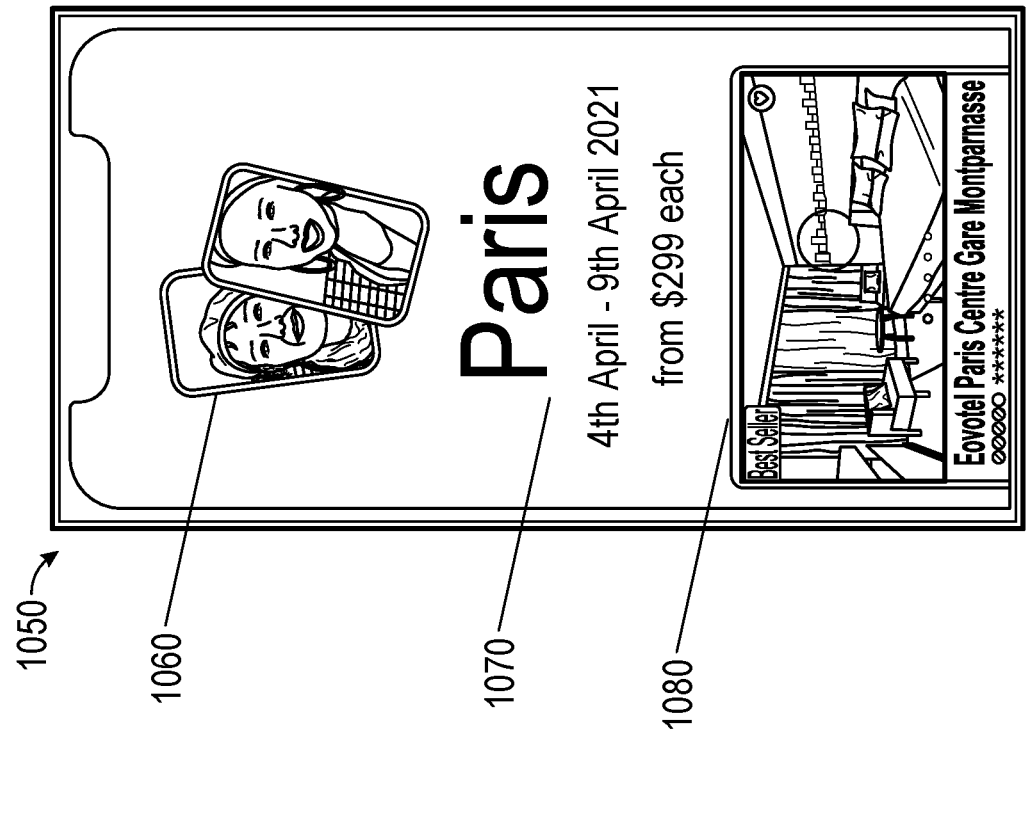
FIG. 10 illustrates examples of an augmented reality (AR) content generator, and presenting AR content items generated by an AR content generator in the messaging client application (or the messaging system), according to some embodiments.

FIG. 10 illustrates examples of an augmented reality (AR) content generator, and presenting various content items generated by an AR content generator in the messaging client application 104 (or the messaging system 100), according to some embodiments.

In the examples of FIG. 10, an AR content generator, (e.g., corresponding to augmented reality content generator 910, as discussed above), provides augmented reality experiences with AR content items (e.g., 3D or 2D objects rendered for display in the messaging client application 104) to select a time period(s) that the user is able to travel with at least another user in the messaging system 100.

As shown, user interface 1000 includes an AR content item 1010 corresponding to a calendar. Using touch inputs, the user can select a period of time based on the dates shown in the calendar. Moreover, the user can navigate to different period of times (e.g., different months) using selectable graphical items in the AR content item 1010 such as scroll elements, buttons, and the like.

In this example, after selecting a particular period of time, user interface 1050 is provided for display on the client device 102, which includes AR content item 1060, AR content item 1070, and AR content item 1080. AR content item 1060 corresponds to respective graphical items shown profile images or digital avatars including the user and at least one other user that the travel planning involves. AR content item 1070 shows an indication of a destination geolocation and information for the selected period of time (e.g., pricing information). AR content item 1080 includes information related to a hotel (or activity in another example) that can be booked for the selected period of time. In an embodiment, the user can select AR content item 1080 which can then cause a 3D scene (or other additional AR content) to be displayed on the client device 102 to enable the user to further explore place of business (e.g., a hotel room, tourist attraction, landmark, and the like) associated with the AR content item 1080. This enables an additional AR experience to be provided to the user(s) and further enhance the booking user experience (UX). Similar to examples described before, the user can share the AR experience of exploring the place of business with the other user which the user is planning to travel with to the destination geolocation.

FIG. 11 illustrates examples of an augmented reality (AR) content generator, and presenting AR content items generated by an AR content generator in the messaging client application 104 (or the messaging system 100), according to some embodiments.

In the examples of FIG. 11, an AR content generator, (e.g., corresponding to augmented reality content generator 910, as discussed above), provides augmented reality experiences with AR content items (e.g., 3D or 2D objects rendered for display in the messaging client application 104) to show an itinerary (or set of activities or locations) for a trip to a given destination geolocation that the user has planned with at least another user in the messaging system 100.

As shown, user interface 1100 includes an AR content item 1110 corresponding to a trip itinerary. Using touch inputs, the user can select AR content item 1110 to further display activities or locations for the trip itinerary.

In this example, after selecting AR content item 1110, user interface 1150 is provided for display on the client device 102, which includes AR content item 1160, AR content item 1170, and AR content item 1180. AR content item 1160 corresponds to a map of the destination geolocation, AR content item 1170 is a detailed view of the trip itinerary, and AR content item 1180 includes information for a place of business that is to be visited during the trip itinerary. As mentioned above, the trip itinerary may correspond to the selected period of time that the travel has been planned by the user.

FIG. 12 illustrates examples of an augmented reality (AR) content generator, and presenting AR content items generated by the AR content generator in the messaging client application 104 (or the messaging system 100), according to some embodiments.

In the examples of FIG. 12, an AR content generator 1210, (e.g., corresponding to a selectable graphical item), provides augmented reality experiences with AR content items (e.g., 3D or 2D objects rendered for display in the messaging client application 104) to show an animation of images of different activities or locations for a particular destination geolocation (e.g., similar in appearance to a shuffling picture slide deck) corresponding to a future travel location of the user. Using touch inputs, the user can select the selectable graphical item in user interface 1200, corresponding to the AR content generator 1210, to further display activities or locations for a destination geolocation.

In an embodiment, the AR content generator 1210 can provide other graphical items (e.g., a text entry field or box, a map, or a dropdown list with a set of destination geolocations, and the like) for receiving user input to select a particular destination geolocation. In another embodiment, the AR content generator 1210 can select a particular destination geolocation based signals such as user activity, user profile information, user preferences, and the like.

As shown, user interface 1200 includes an AR content item 1220 included in a set of AR content items. Images corresponding to different activities can be selected in a randomized manner. User input can select pause the animation of images to select a particular image, and upon selection, a 3D immersive view (e.g., 3D scene) of the location corresponding to the activity can be displayed.

Although in this example, the set of AR content items is provided for display as discernable separate AR content items (e.g., stacked cards), in another example only one AR content item may be shown at a time while each of the AR content items are cycled for display at a rapid pace (e.g., similar to an animated shuffling deck of cards or changing flash cards/placards).

In this example, after selecting selectable graphical item corresponding to AR content generator 1210, user interface 1200 is provided for display on the client device 102, which includes AR content item 1220. AR content item 1220 corresponds to a particular activity of the destination geolocation, which may be initially shown and subsequently other AR content items are displayed is rapid succession to mimic an animated deck of cards that shuffle between one AR content item to a second AR content item and continuing in this similar fashion (or similar to different frames of film that are cycled through). In an embodiment, the animation cycles through the various AR content items at multiple AR content items per second but much less than 30 times a second (e.g., 2-5 times a second).

In an example, a long press touch gesture can be received to select a given AR content item (e.g., AR content item 1220). While the long press touch input has yet to be released, the animation cycling through various AR content items is momentarily paused and held to the selected AR content item. In an embodiment, upon release of the long press touch input, a second AR content item (e.g., 3D scene) is displayed on the client device 102. Alternatively, if a gesture input is subsequently received where the position of the long press touch input moves away from and then outside of the selected AR content item, the AR content items can again be animated in a rapid cycling manner.

In an embodiment, after the long press touch input is released, user interface 1250 is provided for display on the client device 102. As illustrated, user interface 1250 includes AR content item(s) that is a 3D scene of the activity corresponding to the previously selected AR content item. In an embodiment, the 3D scene of user interface 1250 can be navigated and moved about based on user inputs received by the client device 102. For example, upon receiving a touch input, a different portion of the 3D scene can be rendered and displayed on the client device 102.

FIG. 13 illustrates examples of user interfaces, and presenting content items generated by an AR content generator in the messaging client application 104 (or the messaging system 100), according to some embodiments.

In the examples of FIG. 13, an AR content generator can provide user interfaces to display "favorites" (e.g., similar to bookmarks or a saved collection of activities, places of businesses, and the like that are grouped according to a particular geolocation) at a travel location or event, and enable sharing favorites to other users. In the following discussion, user interface 1300 is a first interface of a listing of saved travel locations. For each saved travel location, a second interface corresponding to user interface 1350 is provided with different activities or locations with images (e.g., thumbnails or small images) for selection.

As shown, user interface 1300 includes an content item 1330, which corresponds to a selectable graphical item, which is included in a listing of a set of content items. The listing includes selectable graphical items corresponding to different geolocations, and can be sorted by date of creation, in alphabetical order, random order, or some other ordering criterion (e.g., relative score based on prior user activity indicating an importance metric). User input can select content item 1330 (e.g., Paris) or any of the other content items in user interface 1300, and upon selection can cause another set of content items to be displayed on the client device 102. As further shown, an image 1320 (e.g., digital avatar or profile photo) can be included adjacent or in proximity to a given content item to indicate another user that contributed or has access to the particular content item. User interface 1300 also includes content item 1310 that includes information such as a total number of places (e.g., favorites) that the user has included in various content items from the listing of content items in user interface 1300.

As further shown, user interface 1300 also includes a search interface and a selectable graphical item for creating a new grouping of content items associated with a particular destination geolocation.

In this example, after selecting content item 1330, user interface 1350 is provided for display on the client device 102, which includes a grouping of businesses (or places, or activities, and the like associated with a particular destination geolocation) corresponding to the selected content item 1330 discussed above. In this example, user interface 1350 includes image 1370 (or AR content item) corresponding to a place of business or activity within a geographical area associated with the particular geolocation (e.g., "Paris") and information 1380 which includes a description of the place of business and also other information such as an address and a number of times that the viewing user has visited the place of business. As further shown, a set of images 1360 (e.g., digital avatar or profile photo) are included in user interface 1350 to indicate various users that have access to content or have contributed to providing a particular place of business corresponding to content item 1330 discussed above. In embodiment, additional users (e.g., users connected to each other in a social graph) can be added to allow access to the grouping of business in user interface 1350 by selecting selectable graphical item 1365 ("Add Friends"). As further shown, user interface 1350 also includes a search interface for searching content items.

In an embodiment, upon receiving a selection of one of the images corresponding to a particular place of business of activity, a display of information is provided for display based on a second geolocation of the activity or place of business within the geographical area. Such a selection can be a touch input such as a tap touch input.

FIG. 14 is a flowchart illustrating a method 1400, according to certain example embodiments. The method 1400 may be embodied in computer-readable instructions for execution by one or more computer processors such that the operations of the method 1400 may be performed in part or in whole by the messaging client application 104, particularly with respect to respective components of the annotation system 206 described above in FIG. 7; accordingly, the method 1400 is described below by way of example with reference thereto. However, it shall be appreciated that at least some of the operations of the method 1400 may be deployed on various other hardware configurations and the method 1400 is not intended to be limited to the messaging client application 104.

At operation 1402, the augmented reality content generator module 714 selects a set of augmented reality content generators from a plurality of available augmented reality content generators, the selected set of augmented reality content generators comprising at least one augmented reality content generator for presenting a three-dimensional (3D) scene based at least in part on a geolocation.

At operation 1404, the rendering module 710 causes, at a client device, display of a graphical interface comprising a plurality of selectable graphical items, each selectable graphical item corresponding to a respective augmented reality content generator of the set of augmented reality content generators.

At operation 1406, AR content generator module 714 receives, at the client device, a selection of a first selectable graphical item from the plurality of selectable graphical items, the first selectable graphical item comprising a first augmented reality content generator corresponding to a particular geolocation.

At operation 1408, the rendering module 710 causes display, at the client device, at least one augmented content reality item generated by the first augmented reality content generator, the at least one augmented content reality item comprising the 3D scene based at least in part on the particular geolocation.

At operation 1410, the rendering module 710 causes display, at a second client device, the at least one augmented content reality item generated by the first augmented reality content generator, the at least one augmented content reality item comprising the 3D scene based at least in part on the particular geolocation.

Figure 15:
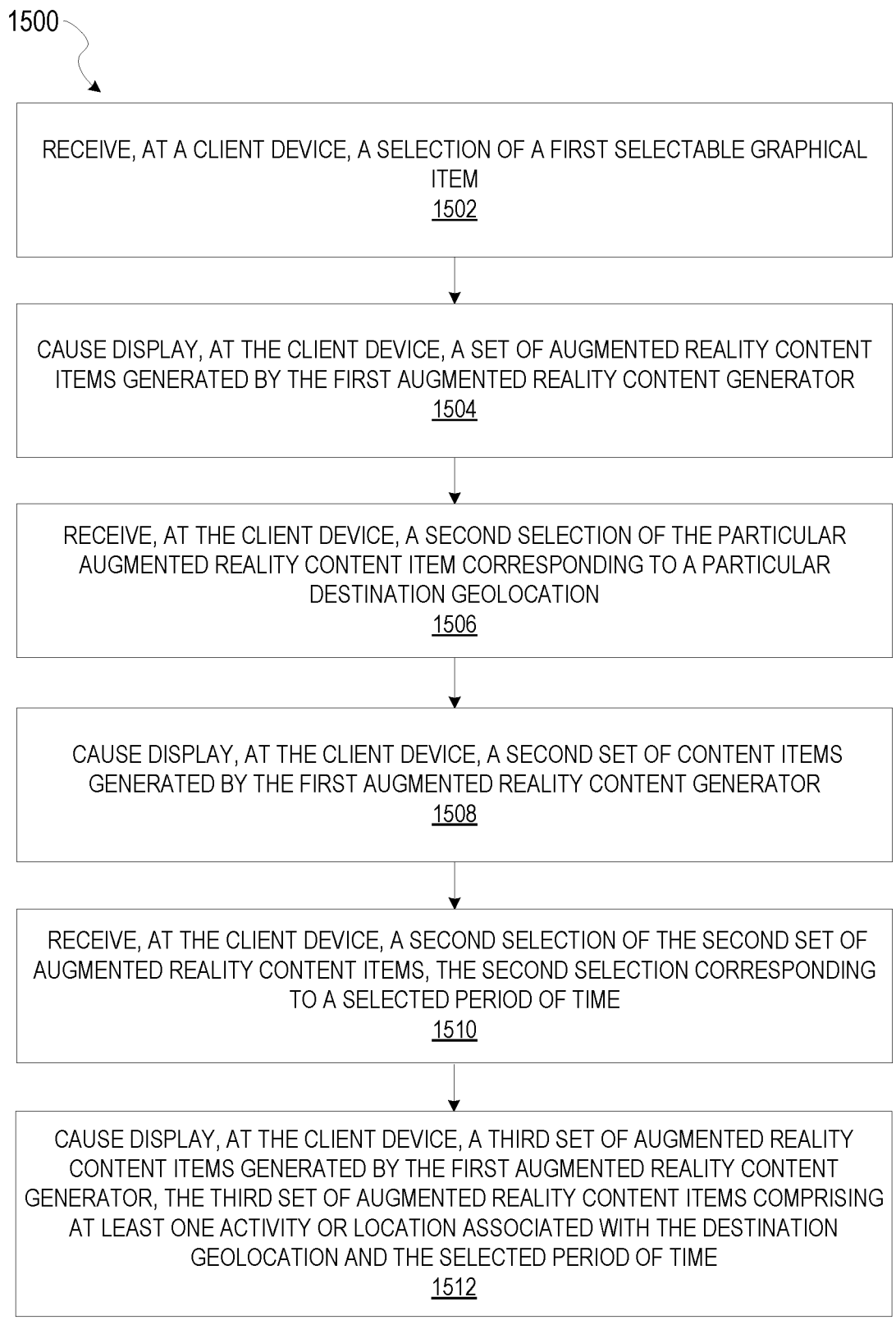
FIG. 15 is a flowchart illustrating a method, according to certain example embodiments.

FIG. 15 is a flowchart illustrating a method 1500, according to certain example embodiments. The method 1500 may be embodied in computer-readable instructions for execution by one or more computer processors such that the operations of the method 1500 may be performed in part or in whole by the messaging client application 104, particularly with respect to respective components of the annotation system 206 described above in FIG. 7; accordingly, the method 1500 is described below by way of example with reference thereto. However, it shall be appreciated that at least some of the operations of the method 1500 may be deployed on various other hardware configurations and the method 1500 is not intended to be limited to the messaging client application 104.

At operation 1502, the augmented reality content generator module 714 receives, at a client device, a selection of a first selectable graphical item, the first selectable graphical item comprising a first augmented reality content generator.

At operation 1504, the rendering module 710 causes display, at the client device, a set of augmented reality content items generated by the first augmented reality content generator, each of the set of augmented reality content items including a particular augmented reality content item corresponding to a destination geolocation different than a current geolocation.

At operation 1506, the augmented reality content generator module 714 receives, at the client device, a second selection of the particular augmented reality content item corresponding to the destination geolocation.

At operation 1508, the rendering module 710 causes display, at the client device, a second set of augmented reality content items generated by the first augmented reality content generator, the second set of augmented reality content items comprising a scheduling tool, the scheduling tool comprising an visual arrangement of particular dates organized over a period of time including the particular dates.

At operation 1510, the augmented reality content generator module 714 receives, at the client device, a second selection of the second set of augmented reality content items, the second selection corresponding to a selected period of time.

At operation 1512, the rendering module 710 causes display, at the client device, a third set of augmented reality content items generated by the first augmented reality content generator, the third set of augmented reality content items comprising at least one activity or location associated with the destination geolocation and the selected period of time.

Figure 16:
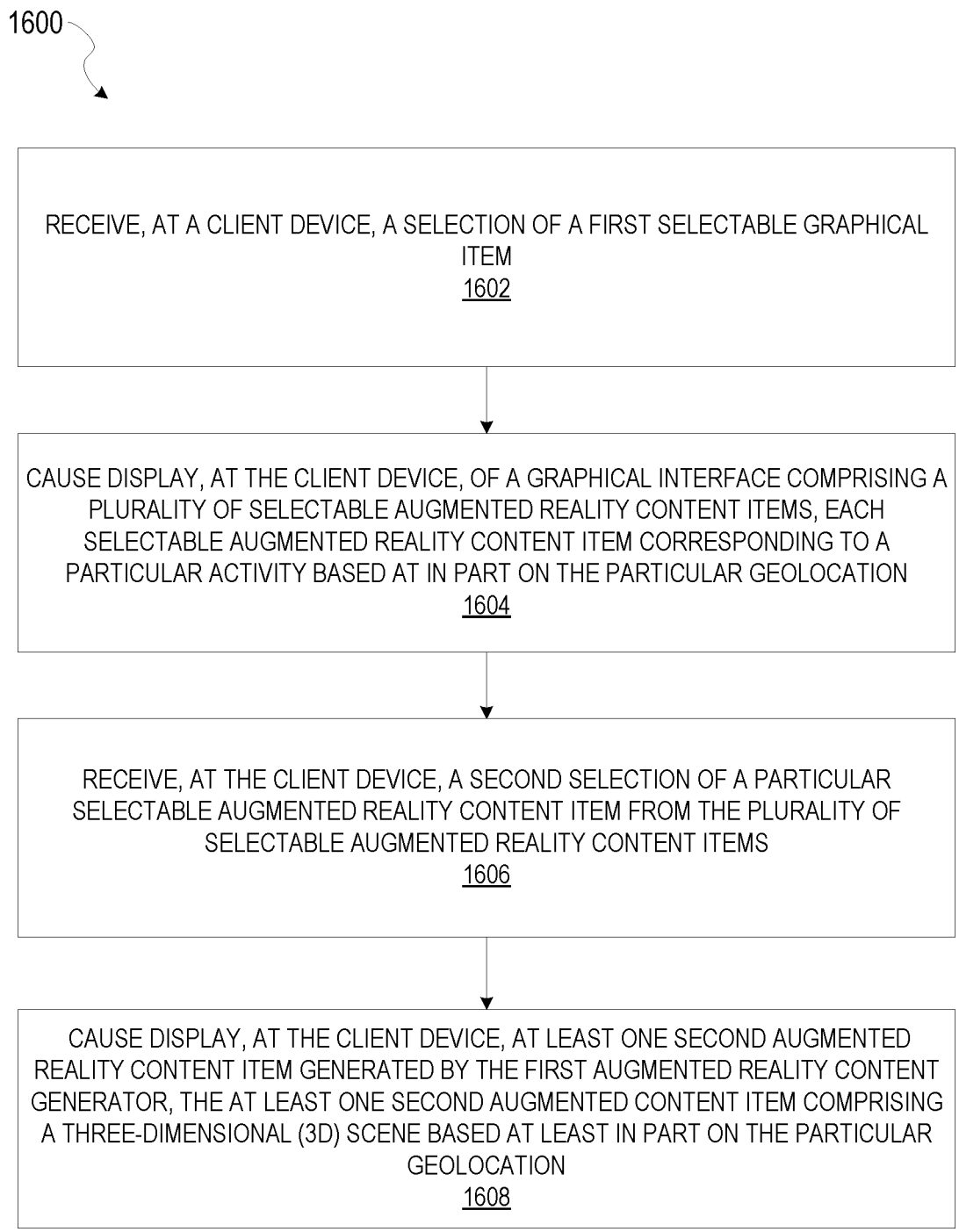
FIG. 16 is a flowchart illustrating a method, according to certain example embodiments.

FIG. 16 is a flowchart illustrating a method 1600, according to certain example embodiments. The method 1600 may be embodied in computer-readable instructions for execution by one or more computer processors such that the operations of the method 1600 may be performed in part or in whole by the messaging client application 104, particularly with respect to respective components of the annotation system 206 described above in FIG. 7; accordingly, the method 1600 is described below by way of example with reference thereto. However, it shall be appreciated that at least some of the operations of the method 1600 may be deployed on various other hardware configurations and the method 1600 is not intended to be limited to the messaging client application 104.

At operation 1602, the augmented reality content generator module 714 receives, at a client device, a selection of a first selectable graphical item, the first selectable graphical item comprising a first augmented reality content generator corresponding to a particular geolocation.

At operation 1604, the rendering module 710 causes display, at the client device, of a graphical interface comprising a plurality of selectable augmented reality content items, each selectable augmented reality content item corresponding to a particular activity based at in part on the particular geolocation.

At operation 1606, the augmented reality content generator module 714 receives, at the client device, a second selection of a particular selectable augmented reality content item from the plurality of selectable augmented reality content items.

At operation 1608, the rendering module 710 causing display, at the client device, at least one second augmented reality content item generated by the first augmented reality content generator, the at least one second augmented content item comprising a three-dimensional (3D) scene based at least in part on the particular geolocation.

FIG. 17 is a flowchart illustrating a method 1700, according to certain example embodiments. The method 1700 may be embodied in computer-readable instructions for execution by one or more computer processors such that the operations of the method 1700 may be performed in part or in whole by the messaging client application 104, particularly with respect to respective components of the annotation system 206 described above in FIG. 7; accordingly, the method 1700 is described below by way of example with reference thereto. However, it shall be appreciated that at least some of the operations of the method 1700 may be deployed on various other hardware configurations and the method 1700 is not intended to be limited to the messaging client application 104.

At operation 1702, the rendering module 710 causes, at a client device, display of a graphical interface comprising a plurality of selectable graphical items, each selectable graphical item corresponding to a respective content item associated with a different geolocation.

At operation 1704, the augmented reality content generator module 714 receives, at the client device, a selection of a first selectable graphical item from the plurality of selectable graphical items, the first selectable graphical item corresponding to a particular geolocation.

At operation 1706, the rendering module 710 causes display, at the client device, a second plurality of selectable graphical items, each of the second plurality of selectable graphical items corresponding to a particular second geolocation of an activity or place of business within a geographical area associated with the particular geolocation.

Figure 18:
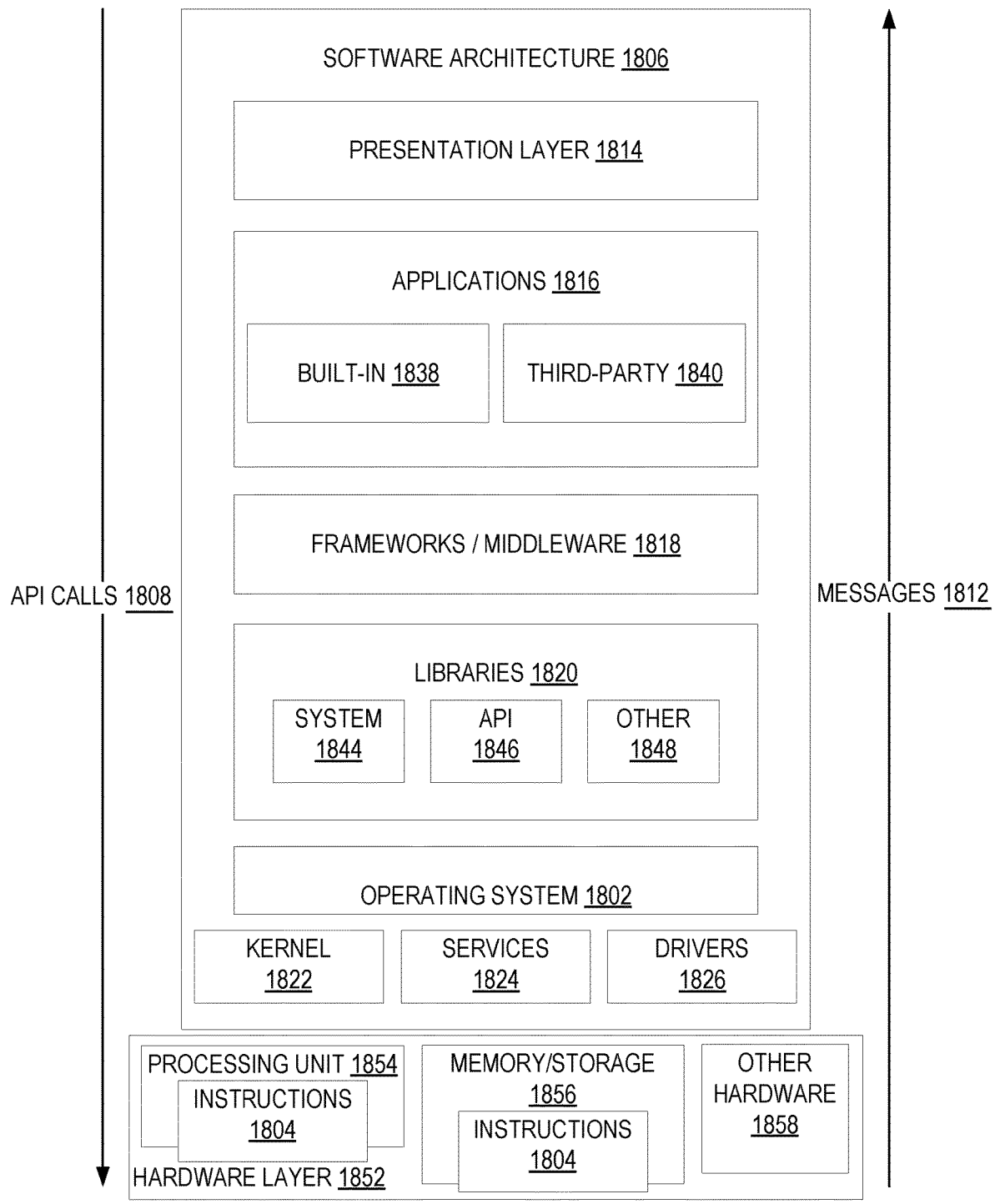
FIG. 18 is block diagram showing a software architecture within which the present disclosure may be implemented, in accordance with some example embodiments.

FIG. 18 is a block diagram illustrating an example software architecture 1806, which may be used in conjunction with various hardware architectures herein described. FIG. 18 is a non-limiting example of a software architecture and it will be appreciated that many other architectures may be implemented to facilitate the functionality described herein. The software architecture 1806 may execute on hardware such as machine 1900 of FIG. 19 that includes, among other things, processors 1904, memory 1914, and (input/output) I/O components 1918. A representative hardware layer 1852 is illustrated and can represent, for example, the machine 1900 of FIG. 19. The representative hardware layer 1852 includes a processing unit 1854 having associated executable instructions 1804. Executable instructions 1804 represent the executable instructions of the software architecture 1806, including implementation of the methods, components, and so forth described herein. The hardware layer 1852 also includes memory and/or storage modules memory/storage 1856, which also have executable instructions 1804. The hardware layer 1852 may also comprise other hardware 1858.

In the example architecture of FIG. 18, the software architecture 1806 may be conceptualized as a stack of layers where each layer provides particular functionality. For example, the software architecture 1806 may include layers such as an operating system 1802, libraries 1820, frameworks/middleware 1818, applications 1816, and a presentation layer 1814. Operationally, the applications 1816 and/or other components within the layers may invoke API calls 1808 through the software stack and receive a response as in messages 1812 to the API calls 1808. The layers illustrated are representative in nature and not all software architectures have all layers. For example, some mobile or special purpose operating systems may not provide a frameworks/middleware 1818, while others may provide such a layer. Other software architectures may include additional or different layers.

The operating system 1802 may manage hardware resources and provide common services. The operating system 1802 may include, for example, a kernel 1822, services 1824, and drivers 1826. The kernel 1822 may act as an abstraction layer between the hardware and the other software layers. For example, the kernel 1822 may be responsible for memory management, processor management (e.g., scheduling), component management, networking, security settings, and so on. The services 1824 may provide other common services for the other software layers. The drivers 1826 are responsible for controlling or interfacing with the underlying hardware. For instance, the drivers 1826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1820 provide a common infrastructure that is used by the applications 1816 and/or other components and/or layers. The libraries 1820 provide functionality that allows other software components to perform tasks in an easier fashion than to interface directly with the underlying operating system 1802 functionality (e.g., kernel 1822, services 1824 and/or drivers 1826). The libraries 1820 may include system libraries 1844 (e.g., C standard library) that may provide functions such as memory allocation functions, string manipulation functions, mathematical functions, and the like. In addition, the libraries 1820 may include API libraries 1846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1820 may also include a wide variety of other libraries 1848 to provide many other APIs to the applications 1816 and other software components/modules.

The frameworks/middleware 1818 (also sometimes referred to as middleware) provide a higher-level common infrastructure that may be used by the applications 1816 and/or other software components/modules. For example, the frameworks/middleware 1818 may provide various graphic user interface (GUI) functions, high-level resource management, high-level location services, and so forth. The frameworks/middleware 1818 may provide a broad spectrum of other APIs that may be used by the applications 1816 and/or other software components/modules, some of which may be specific to a particular operating system 1802 or platform.

The applications 1816 include built-in applications 1838 and/or third-party applications 1840. Examples of representative built-in applications 1838 may include, but are not limited to, a contacts application, a browser application, a book reader application, a location application, a media application, a messaging application, and/or a game application. Third-party applications 1840 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 1840 may invoke the API calls 1808 provided by the mobile operating system (such as operating system 1802) to facilitate functionality described herein.

The applications 1816 may use built in operating system functions (e.g., kernel 1822, services 1824 and/or drivers 1826), libraries 1820, and frameworks/middleware 1818 to create user interfaces to interact with users of the system. Alternatively, or additionally, in some systems interactions with a user may occur through a presentation layer, such as presentation layer 1814. In these systems, the application/component 'logic' can be separated from the aspects of the application/component that interact with a user.

Figure 19:
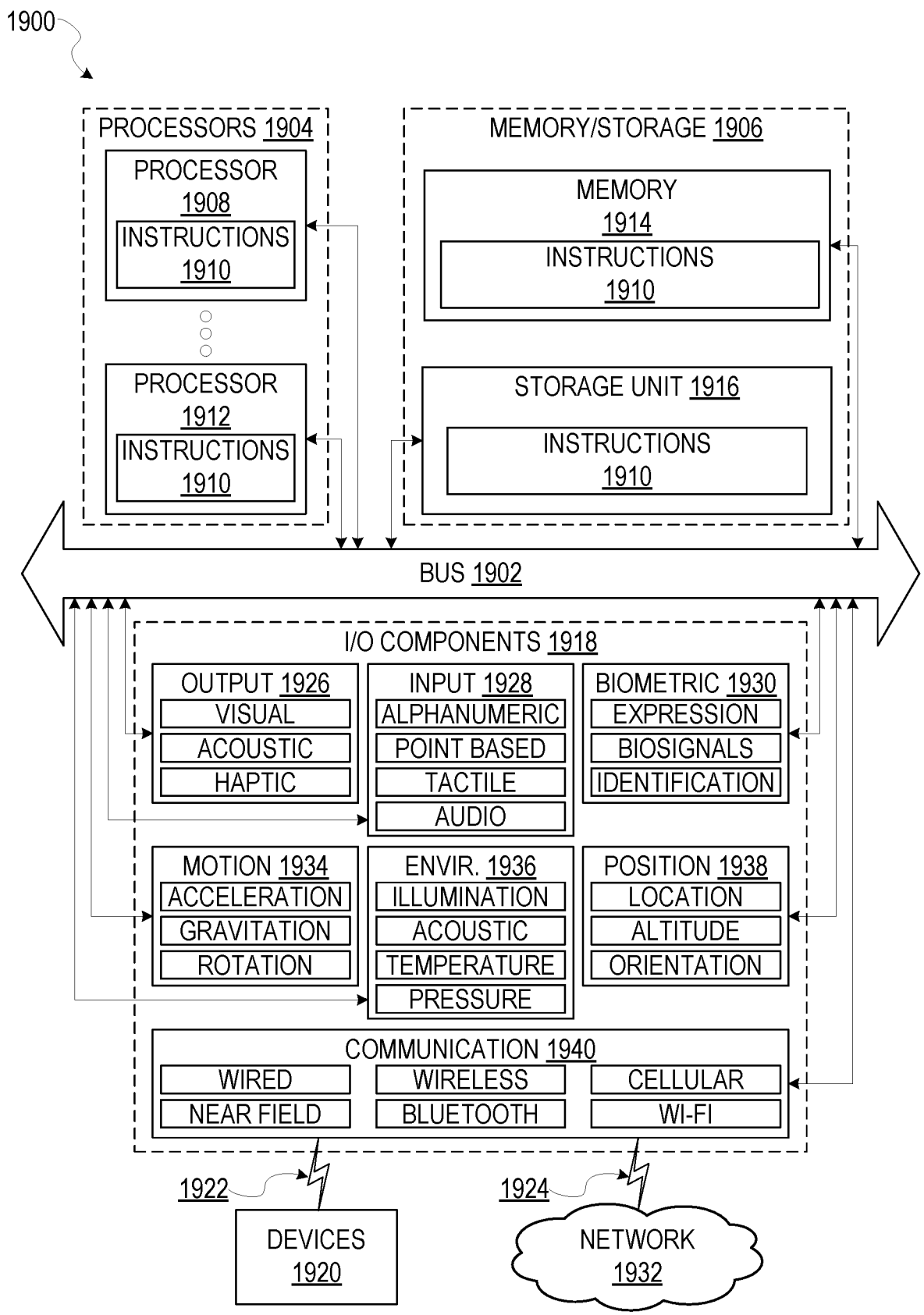
FIG. 19 is a diagrammatic representation of a machine, in the form of a computer system within which a set of instructions may be executed for causing the machine to perform any one or more of the methodologies discussed, in accordance with some example embodiments.

FIG. 19 is a block diagram illustrating components of a machine 1900, according to some example embodiments, able to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1910 (e.g., software, a program, an application, an applet, an app, or other executable code) for causing the machine 1900 to perform any one or more of the methodologies discussed herein may be executed. As such, the instructions 1910 may be used to implement modules or components described herein. The instructions 1910 transform the general, non-programmed machine 1900 into a particular machine 1900 programmed to carry out the described and illustrated functions in the manner described. In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1910, sequentially or otherwise, that specify actions to be taken by machine 1900. Further, while only a single machine 1900 is illustrated, the term 'machine' shall also be taken to include a collection of machines that individually or jointly execute the instructions 1910 to perform any one or more of the methodologies discussed herein.

The machine 1900 may include processors 1904, including processor 1908 to processor 1912, memory/storage 1906, and I/O components 1918, which may be configured to communicate with each other such as via a bus 1902. The memory/storage 1906 may include a memory 1914, such as a main memory, or other memory storage, and a storage unit 1916, both accessible to the processors 1904 such as via the bus 1902. The storage unit 1916 and memory 1914 store the instructions 1910 embodying any one or more of the methodologies or functions described herein. The instructions 1910 may also reside, completely or partially, within the memory 1914, within the storage unit 1916, within at least one of the processors 1904 (e.g., within the processor's cache memory), or any suitable combination thereof, during execution thereof by the machine 1900. Accordingly, the memory 1914, the storage unit 1916, and the memory of processors 1904 are examples of machine-readable media.

The I/O components 1918 may include a wide variety of components to receive input, provide output, produce output, transmit information, exchange information, capture measurements, and so on. The specific I/O components 1918 that are included in a particular machine 1900 will depend on the type of machine. For example, portable machines such as mobile phones will likely include a touch input device or other such input mechanisms, while a headless server machine will likely not include such a touch input device. It will be appreciated that the I/O components 1918 may include many other components that are not shown in FIG. 19. The I/O components 1918 are grouped according to functionality merely for simplifying the following discussion and the grouping is in no way limiting. In various example embodiments, the I/O components 1918 may include output components 1926 and input components 1928. The output components 1926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1918 may include biometric components 1930, motion components 1934, environmental components 1936, or position components 1938 among a wide array of other components. For example, the biometric components 1930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1934 may include acceleration sensor components (e.g., accelerometer), gravitation sensor components, rotation sensor components (e.g., gyroscope), and so forth. The environmental components 1936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1918 may include communication components 1940 operable to couple the machine 1900 to a network 1932 or devices 1920 via coupling 1924 and coupling 1922, respectively. For example, the communication components 1940 may include a network interface component or other suitable device to interface with the network 1932. In further examples, communication components 1940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1920 may be another machine or any of a wide variety of peripheral devices (e.g., a peripheral device coupled via a USB).

Moreover, the communication components 1940 may detect identifiers or include components operable to detect identifiers. For example, the communication components 1940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1940, such as, location via Internet Protocol (IP) geo-location, location via Wi-Fi® signal triangulation, location via detecting a NFC beacon signal that may indicate a particular location, and so forth.

The following discussion relates to various terms or phrases that are mentioned throughout the subject disclosure.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component'(or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In the subject disclosure, a client device is also referred to as an 'electronic device.'

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

'Signal Medium' refers to any intangible medium that is capable of storing, encoding, or carrying the instructions for execution by a machine and includes digital or analog communications signals or other intangible media to facilitate communication of software or data. The term 'signal medium' shall be taken to include any form of a modulated data signal, carrier wave, and so forth. The term 'modulated data signal' means a signal that has one or more of its characteristics set or changed in such a matter as to encode information in the signal. The terms 'transmission medium' and 'signal medium' mean the same thing and may be used interchangeably in this disclosure.

'Communication Network' refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

'Processor' refers to any circuit or virtual circuit (a physical circuit emulated by logic executing on an actual processor) that manipulates data values according to control signals (e.g., 'commands', 'op codes', 'machine code', etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as 'cores') that may execute instructions contemporaneously.

'Machine-Storage Medium' refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms 'machine-storage medium,' 'device-storage medium,' 'computer-storage medium' mean the same thing and may be used interchangeably in this disclosure. The terms 'machine-storage media,' 'computer-storage media,' and 'device-storage media' specifically exclude carrier waves, modulated data signals, and other such media, at least some of which are covered under the term 'signal medium.'

'Component' refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A 'hardware component' is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase 'hardware component'(or 'hardware-implemented component') should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, 'processor-implemented component' refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a 'cloud computing' environment or as a 'software as a service' (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

'Carrier Signal' refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

'Computer-Readable Medium' refers to both machine-storage media and transmission media. Thus, the terms include both storage devices/media and carrier waves/modulated data signals. The terms 'machine-readable medium,' 'computer-readable medium' and 'device-readable medium' mean the same thing and may be used interchangeably in this disclosure.

'Client Device' refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

'Ephemeral Message' refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:

1. A method, comprising:
   causing, at a client device, display of a graphical interface comprising a plurality of selectable graphical items, each selectable graphical item corresponding to a respective content item associated with a different geolocation, wherein the plurality of selectable graphical items further comprises a digital avatar of a particular user displayed in proximity to at least one of the selectable graphical items, the digital avatar corresponding to a representation of the particular user and indicating that the particular user has contributed or has access to the respective content item;
   causing, at the client device, display of a plurality of content items, each of the plurality of content items including information indicating a total number of places included in the respective content item associated with the different geolocation; and
   causing display, at the client device, a second plurality of selectable graphical items, each of the second plurality of selectable graphical items corresponding to a particular second geolocation of an activity or place of business within a geographical area associated with a particular geolocation.

2. The method of claim 1, further comprising:
   receiving a selection of one of the second plurality of selectable graphical items; and
   in response to receiving the selection, causing display of information based on the particular second geolocation of the activity or place of business within the geographical area.

3. The method of claim 2, wherein the selection comprises a tap touch input.

4. The method of claim 1, wherein the plurality of selectable graphical items comprises a listing of graphical items indicating different destination geolocations.

5. The method of claim 4, wherein the listing of graphical items is displayed in an order based on a relative score, the relative score based on prior user activity indicating an importance metric.

6. The method of claim 5, wherein the plurality of selectable graphical items further comprises a search interface.

7. The method of claim 1, further comprising:
   receiving, at the client device, a selection of a first selectable graphical item from the plurality of selectable graphical items, the first selectable graphical item corresponding to a particular geolocation.

8. The method of claim 1, wherein the second plurality of selectable graphical items further includes a particular selectable graphical item to include additional users.

9. The method of claim 8, wherein the second plurality of selectable graphical items further includes a second search interface.

10. The method of claim 8, wherein the additional users are connected to a social graph of a first user, the first user associated with the client device.

11. A system comprising:
    a processor; and
    a memory including instructions that, when executed by the processor, cause the processor to perform operations comprising:
    causing, at a client device, display of a graphical interface comprising a plurality of selectable graphical items, each selectable graphical item corresponding to a respective content item associated with a different geolocation, wherein the plurality of selectable graphical items further comprises a digital avatar of a particular user displayed in proximity to at least one of the selectable graphical items, the digital avatar corresponding to a representation of the particular user and indicating that the particular user has contributed or has access to the respective content item;
    causing, at the client device, display of a plurality of content items, each of the plurality of content items including information indicating a total number of places included in the respective content item associated with the different geolocation; and
    causing display, at the client device, a second plurality of selectable graphical items, each of the second plurality of selectable graphical items corresponding to a particular second geolocation of an activity or place of business within a geographical area associated with a particular geolocation.

12. The system of claim 11, wherein the operations further comprise:
    receiving a selection of one of the second plurality of selectable graphical items; and
    in response to receiving the selection, causing display of information based on the particular second geolocation of the activity or place of business within the geographical area.

13. The system of claim 12, wherein the selection comprises a tap touch input.

14. The system of claim 11, wherein the plurality of selectable graphical items comprises a listing of graphical items indicating different destination geolocations.

15. The system of claim 14, wherein the listing of graphical items is displayed in an order based on a relative score, the relative score based on prior user activity indicating an importance metric.

16. The system of claim 15, wherein the plurality of selectable graphical items further comprises a search interface.

17. The system of claim 11, wherein the operations further comprise:
receiving, at the client device, a selection of a first selectable graphical item from the plurality of selectable graphical items, the first selectable graphical item corresponding to a particular geolocation.

18. The system of claim 11, wherein the second plurality of selectable graphical items further includes a particular selectable graphical item to include additional users.

19. The system of claim 18, wherein the second plurality of selectable graphical items further includes a second search interface.

20. A non-transitory computer-readable medium comprising instructions, which when executed by a computing device, cause the computing device to perform operations comprising:

causing, at a client device, display of a graphical interface comprising a plurality of selectable graphical items, each selectable graphical item corresponding to a respective content item associated with a different geolocation, wherein the plurality of selectable graphical items further comprises a digital avatar of a particular user displayed in proximity to at least one of the selectable graphical items, the digital avatar corresponding to a representation of the particular user and indicating that the particular user has contributed or has access to the respective content item;

causing, at the client device, display of a plurality of content items, each of the plurality of content items including information indicating a total number of places included in the respective content item associated with the different geolocation; and causing display, at the client device, a second plurality of selectable graphical items, each of the second plurality of selectable graphical items corresponding to a particular second geolocation of an activity or place of business within a geographical area associated with a particular geolocation.

* * * * *